United States Patent [19]
Jinno et al.

[11] Patent Number: 5,509,847
[45] Date of Patent: Apr. 23, 1996

[54] CONTROL ROBOT

[75] Inventors: Makoto Jinno, Kanagawa; Takashi Yoshimi, Tiba, both of Japan

[73] Assignee: Kabushiki Kaisha Toshiba, Kawasaki, Japan

[21] Appl. No.: 49,426

[22] Filed: Apr. 20, 1993

Related U.S. Application Data

[62] Division of Ser. No. 661,309, Feb. 27, 1991, Pat. No. 5,265,195.

[30] Foreign Application Priority Data

| Feb. 27, 1990 | [JP] | Japan | 2-44550 |
| Jun. 7, 1990 | [JP] | Japan | 2-147497 |
| Oct. 9, 1990 | [JP] | Japan | 2-269600 |

[51] Int. Cl.$^6$ ............................................. B24B 49/02
[52] U.S. Cl. .................................. 451/11; 451/24; 901/41
[58] Field of Search ...................... 451/5, 11, 24, 451/26, 1, 9; 901/41

[56] References Cited

U.S. PATENT DOCUMENTS

| 3,848,365 | 11/1974 | Bovensiepen et al. | 51/111 R |
| 3,877,180 | 4/1975 | Brecker | 51/165.9 |
| 4,014,142 | 3/1977 | Coes, Jr. | 51/165.77 |
| 4,068,156 | 1/1978 | Johnson et al. | 318/575 |
| 4,115,956 | 9/1978 | Huffman | 51/96 |
| 4,186,529 | 2/1980 | Huffman | 51/288 |
| 4,249,062 | 2/1981 | Hozumi et al. | 219/124.34 |
| 4,369,663 | 1/1983 | Venturello et al. | 73/862.04 |
| 4,370,835 | 2/1983 | von Schneidemesser et al. | 51/165.77 |
| 4,523,049 | 6/1985 | DeFazio | 451/5 |
| 4,534,694 | 8/1985 | Tuda | 414/735 |
| 4,603,511 | 8/1986 | Komatsu et al. | 51/165.71 |
| 4,667,443 | 5/1987 | Sakurai et al. | 51/165.71 |
| 4,680,519 | 7/1987 | Chand et al. | 318/568 |
| 4,691,479 | 9/1987 | Helle | 51/165.71 |
| 4,706,004 | 11/1987 | Komatsu et al. | 318/568 |
| 4,706,372 | 11/1987 | Ferrero et al. | 29/568 |
| 4,909,108 | 3/1990 | Nakada et al. | 83/76.9 |
| 4,984,175 | 1/1991 | Toyoda et al. | 364/513 |
| 4,988,934 | 1/1991 | Toyoda et al. | 318/568.15 |
| 5,006,685 | 4/1991 | Hatano et al. | 219/69.2 |
| 5,067,085 | 11/1991 | Wenzel et al. | 364/474.06 |
| 5,129,044 | 7/1992 | Kashiwagi et al. | 395/86 |
| 5,299,389 | 4/1994 | Yonaha et al. | 451/1 |

FOREIGN PATENT DOCUMENTS

| 0034659 | 9/1981 | European Pat. Off. . |
| 0371872 | 6/1990 | European Pat. Off. . |
| 2505718 | 11/1982 | France . |
| 2159876 | 7/1972 | Germany . |
| 2204581 | 8/1973 | Germany . |
| 2828168 | 1/1979 | Germany . |
| 3836003 | 4/1990 | Germany . |
| 60-52296 | 3/1985 | Japan . |
| 1-234141 | 9/1989 | Japan . |
| 4210365 | 7/1992 | Japan | 451/1 |
| 1367800 | 9/1974 | United Kingdom . |

*Primary Examiner*—Robert A. Rose
*Attorney, Agent, or Firm*—Foley & Lardner

[57] ABSTRACT

Disclosed is a control robot having a machining tool comprising a rotatable tool for grinding at the distal end of the robot arm thereof so as to carry out grinding work with pressing the machining tool against the surface of a work to be machined under predetermined pressure, comprising a posture control shaft for controlling the posture of the machining tool provided at the robot arm; a rotation shaft of the rotatable tool; and arrangement in which the posture control shaft and the rotation shaft of the rotatable tool are respectively arranged in different axial directions.

8 Claims, 23 Drawing Sheets

F I G. 16
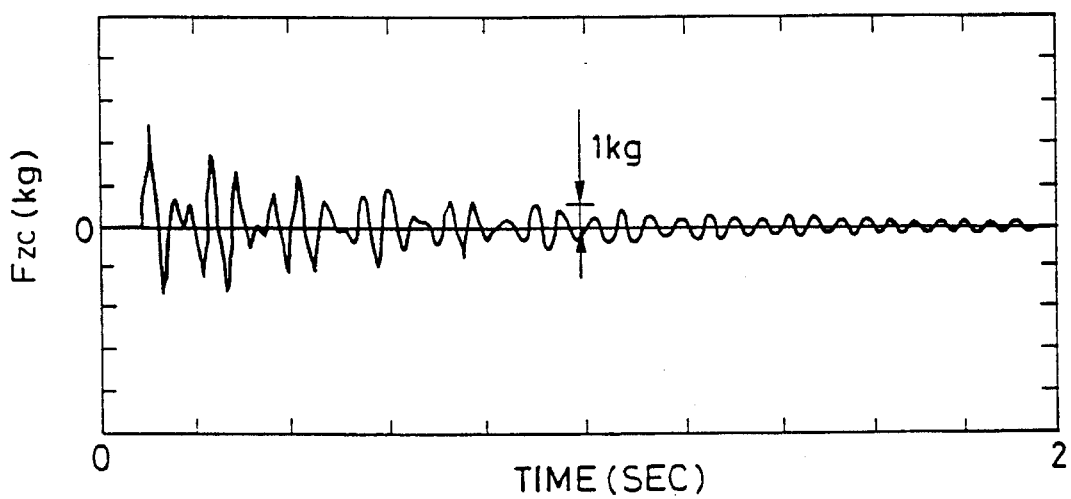
F I G. 17
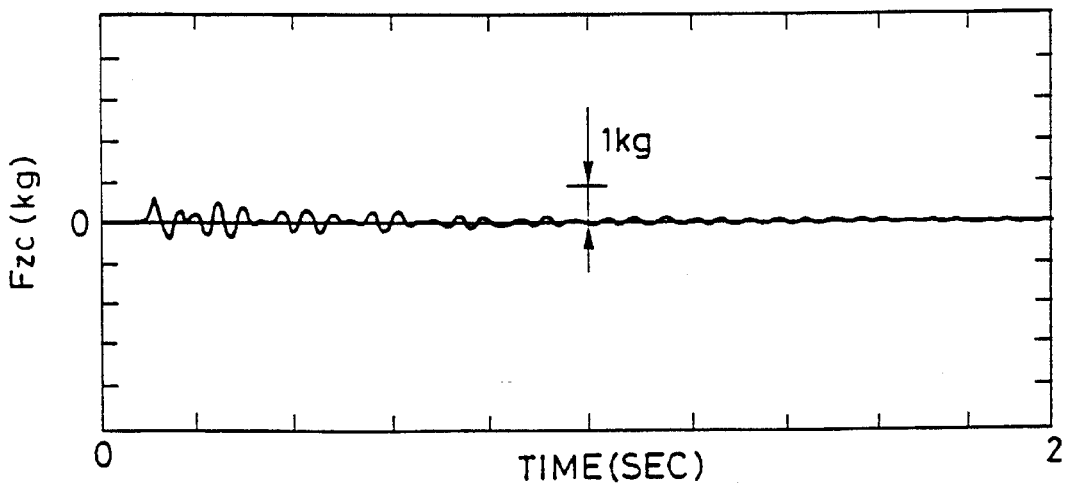

F I G. 20
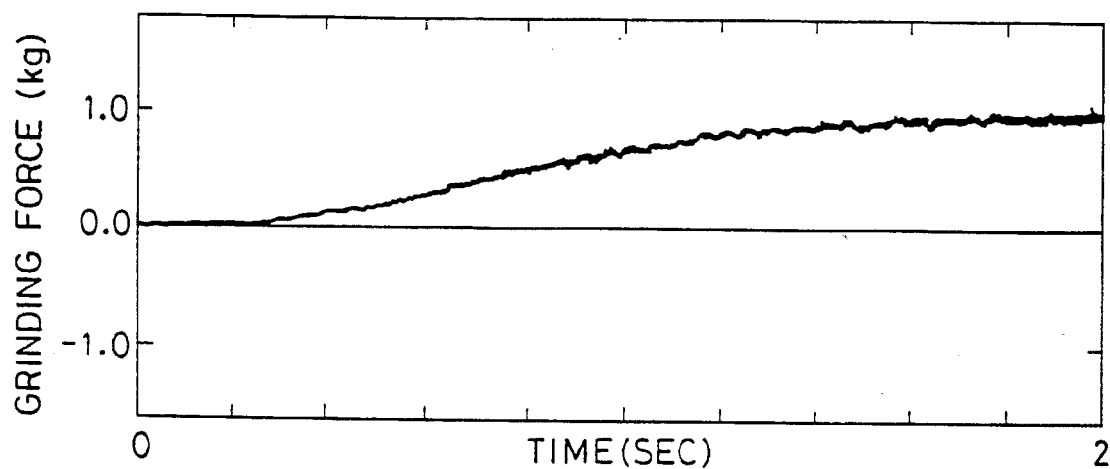
F I G. 21
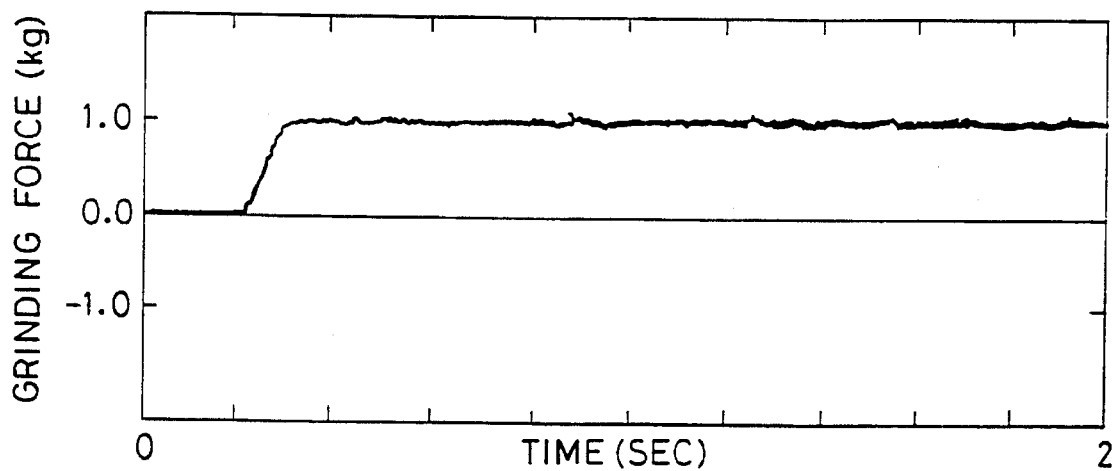

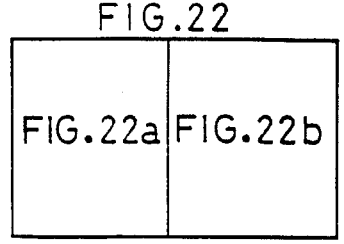
FIG. 22a
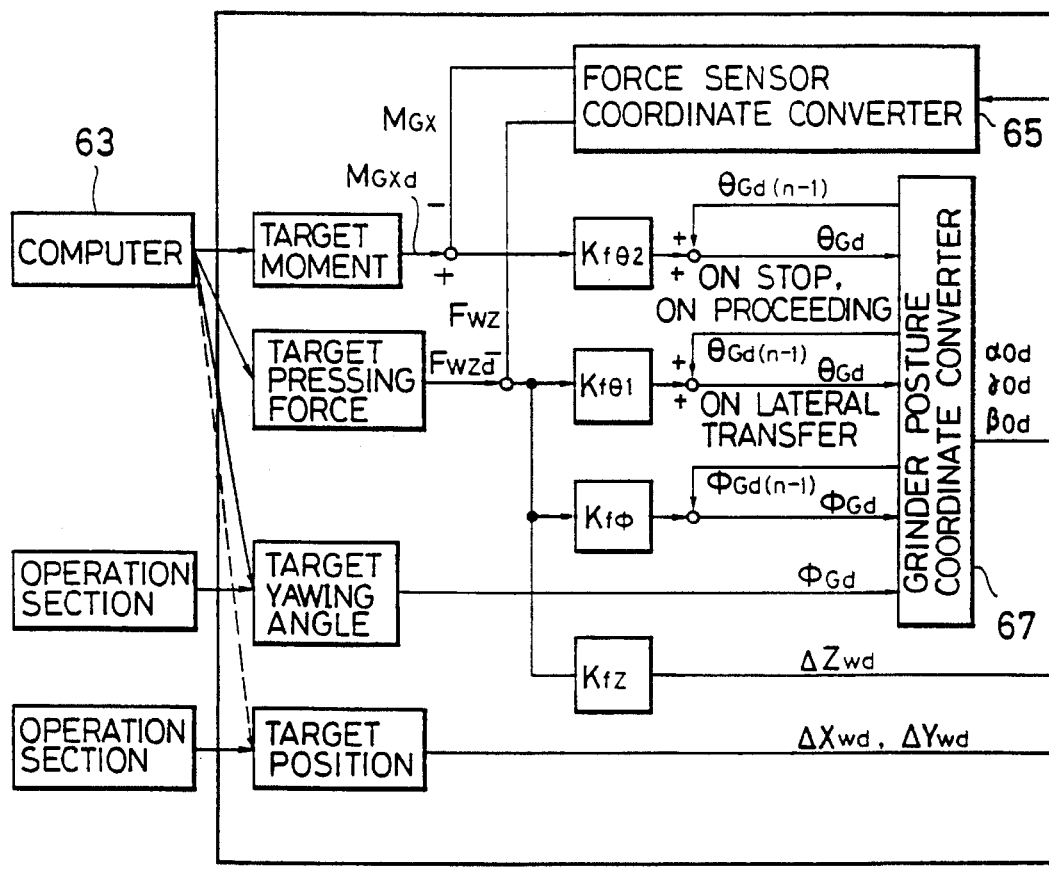

F I G. 25
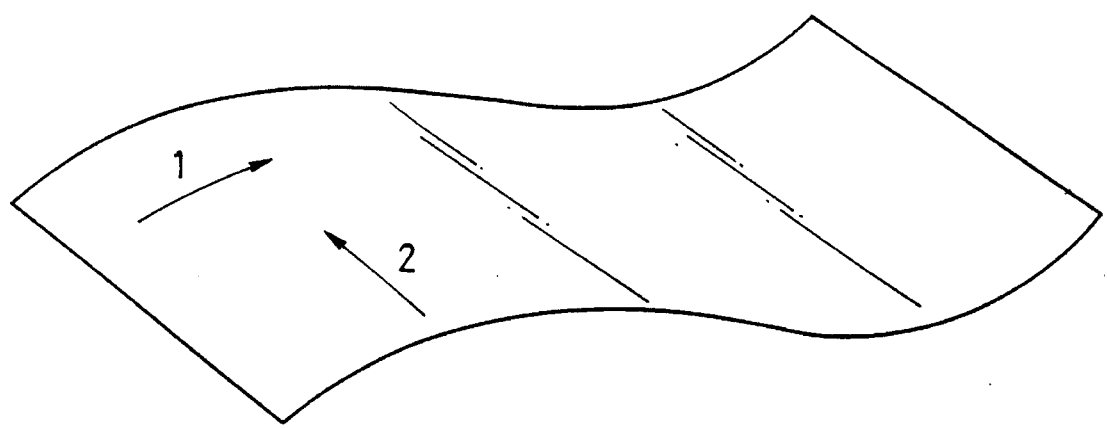

GRINDER PRESSING FORCE

GRINDER PITCH ANGLE

GRINDSTONE DISTAL END ORBIT

CONTROL ROBOT

This application is a divisional, of application Ser. No. 07/661,309, filed Feb. 27, 1991, now U.S. Pat. No. 5,265,195.

BACKGROUND OF THE INVENTION

1. Field of the Invention

The present invention relates to a control robot which has a machining tool comprising a rotatable tool for grinding at the distal end of the robot arm thereof so as to carry out grinding work with pressing the machining tool against the surface of a work to be machined under predetermined pressure, and particularly relates to a force control robot for controlling a robot with detecting pressing force of the machining tool against work to be machined.

2. Description of the Prior Art

As an example of conventional control robots there is a robot which has a machining tool, such as grinder, through a spring or damper at the distal end of the robot arm thereof, and presses the machining tool against a work under predetermined pressure by means of urging force of the spring or damper.

However, in such a robot having so-called compliance by means of a spring or damper, though it is possible to weaken impact force applied to the robot, or to machine the work with force limited in some range when a great control force is generated on contact of the tool against the work, it is difficult to control the pressing force, so that it is impossible to machine works with high accuracy. Moreover, such a robot is likely to be ill-balanced by the weight of the machining tool provided at the robot arm thereof, so that it is difficult to control the pressing force at a constant value.

As another example of conventional control robots, there is a robot which has one or two shafts for controlling the pressing direction at the robot arm.

However, in such a robot, since the one or two control shafts are added anew, the arm portion becomes large in size, so that the weight of the portion is greatly increased.

Moreover, as still another example, there are various studies on a control robot which has a six-axes force/torque for detecting the pressing force at the robot arm so as to control the respective shafts to adjust the force at a predetermined value. However, in such a case, since the respective shafts are driven so as to press the machining tool under predetermined pressure in a predetermined direction, the coordinate transformation becomes complex and a great amount of calculation must be required. Moreover, there must be also required troublesome calculation for the weight compensation to the six-axes force/torque sensor provided for the machining tool, which is changed with postures of the robot. Accordingly, the trouble for such computer operation should, be increased, moreover, an extremely high-speed computer is required. Besides, in this case, because the inertia force of each shaft is much changed with postures of the robot and the rigidity of the robot main body variously changes according to use conditions, it is difficult to control the pressing force with high accuracy, therefore, such a robot can not be applied to various machining conditions and working postures.

As stated above, in the conventional control robots, it is difficult to carry out the machining work with high accuracy. Moreover, to control the pressing force more precisely, it is necessary to add control shafts for the force control anew and an extremely great amount of calculation required therefor. Besides, the machining condition and working posture should be limited in small ranges.

Moreover, in a force control robot having a six-axes force/torque-sensor between a machining tool, for example a grinder, and the robot arm so as to press the tool against a work with a predetermined force in an optional direction, the force along each shaft and moment about each shaft, or the synthesized force of these, each detected by the six-axes force/torque sensor is so controlled as to be a predetermined value.

Namely, compliance control or hybrid control is carried out by directly detecting the direction of force or moment and incorporating data on the detected force or moment in a control loop.

However, in such a robot, because the weight of the machining tool attached at the distal end of the torque sensor is relatively large, when the tool is moved at high acceleration, the inertia force generated by the acceleration should be detected by the torque sensor.

Moreover, by such a detection method by means of the torque sensor, it is impossible to discriminate between the pressing force and the inertia force.

Accordingly, in such construction of the above-mentioned control robot, it is difficult to measure only the pressing force applied to a work from the machining tool.

While, in such a conventional force detection method, even when the tool is not in contact with a work, a data on the inertia force generated by movement of the tool and vibration of the arm is transferred to the control system without discrimination from the pressing force. Moreover, since the inertia force is so large as or lager than the pressing force, it can not be ignored. If the inertia force is ignored on the machining work, it is impossible to carry out the work desirably.

Even though the vibration of tool is very weak, when the inertia force generated thereby is transferred to the control system, the vibration is likely to be increased.

Accordingly, it is very difficult to increase the gain of the force control loop. Moreover, it is impossible to carry out control operation in good response, also it is difficult to realize high accuracy machining work.

Moreover, great amount of calculation shoud be always required for the operation of six-axes force/torque sensor, which depends on the posture of machining tool.

Accordingly, troublesome computer operation be more increased.

As described above, in such a conventional control robot, because of generation of the inertia force of the machining tool provided with the distal end of the robot arm, it is difficult to correctly detect the pressing force applied to a work from the tool, moreover, it is impossible to increase the gain of the force control loop. Therefore, the force control can not be carried out in good response, and it is difficult to realize high accuracy machining work.

Moreover, it is also necessary to calculate the weight compention required for the six-axes force/torque sensor.

While, in the conventional control robot, when the shape of a work to be machined is known, it is possible to carry out machining work with pressing the tool along a normal of the work based on the shape and with always setting the machining tool in a predetermined posture corresponding to the work by changing the posture. However, when the shape of the work is not known in advance, since the robot has no function to judge which posture should be correct, it can not be applied to such a case.

Moreover, even in case that the work shape is already known, the work to teach the robot the shape or to input data corresponding to the shape to the control system should require more trouble as the shape becomes more complex.

While, though now still being studied, there is a proposition about a robot in which a grindstone in a special form and a special force sensor are incorporated in the machining tool so as to grind a work of unknown shape. The robot can not be applied to wide use, so that it is difficult to use the robot for general grinding works. Moreover, since it is necessary to incorporate the grindstone of a special form and the special force sensor in the machining tool, a high production cost must be required.

Namely, the conventional force control robot or force control apparatus can not be applied to a work of unknown shape to be machined, even if possible, an extremely large amount of trouble must be required for teaching the robot the shape of work or inputting the data.

SUMMARY OF THE INVENTION

The present invention was made to solve the above-mentioned problem of the prior art, therefore it is an object thereof to provide a control robot which has an easy structure, and can carry out easy control, so as to perform complex grind work with high accuracy.

It is another object of the present invention to provide a force control robot which can improve the response ability for the force control by correctly detecting the pressing force to a work from the machining tool which is provided at the distal end of the robot arm, and can improve the machining accuracy and reduce the amount of calculation.

It is still another object of the present invention to provide a force control robot which does not require the shape of a work to be machined in advance, and can machine a work of unknown shape with pressing the machining tool against the work along its normal line and with always keeping the tool in a predetermined posture to the work by suitably changing the posture thereof, so as to carry out the machining work with an ordinary tool and a general sensor.

To achieve the above-mentioned objects, a first feature of the present invention is a control robot which has a machining tool comprising a rotatable tool for grinding at the distal end of the robot arm thereof so as to carry out grinding work with pressing the machining tool against the surface of a work to be machined, wherein each posture control shaft for controlling the posture of the robot arm and a rotation shaft of the machining tool are respectively arranged in different axial directions, and the pressing direction of the machining tool is substantially the same as the rotating direction of the posture control shaft.

Moreover, the control robot has a robot control apparatus which can reproduce teaching data obtained with respect to all the robot control shafts on grinding work, and a grind control apparatus for controlling the pressing force of the machining tool by driving one of the posture control shafts on grinding work, wherein operation of one of the posture control shafts is controlled by switching operation from the robot control apparatus to the grind control appratus.

In the control robot, since each posture control shaft for controlling the posture of the robot arm is arranged in a different direction from that of the rotation shaft of the machining tool, it is not necessary to add new shaft for control by controlling the posture control shafts with suitable torque T. Moreover, the same effect can be obtained also by arranging the rotating direction of the posture shafts and the pressing direction of the machining tool to be substantially the same. While, when the pressing force of the machining tool is expressed by F, and the distance from the center of the posture control shafts to the machining point on a work is designated by r, the control is effected so as to establish the relation expressed by $T=F \times r$.

When one of the posture control shafts for torque control is used on grinding work based on teaching data corresponding to teaching points on the surface of a work obtained by operating all the robot shafts including the posture control shafts, the pressing force of the machining tool against the work can be suitably controlled by controlling the torque applied to each posture control shaft with moving the machining point of the tool along a fixed machining orbit by reproducing the teaching work.

Moreover, when the machining tool is well-balanced to the posture control shafts by using a spring or counter weight, it becomes unnecessary to compensate the posture of the tool, moreover, the change of pressing force caused by the change of the posture can be prevented.

The torque control of the posture control shaft referred to here includes torque control used by switching operation together with positional control, or general compliance control or so-called hybrid control.

A second feature of the present invention is a force control robot which detects pressing force to be applied from a machining tool provided at the distal end of the robot arm to a work to be machined, then controls the detected pressing force to be taget pressing force, in which are provided detection means for detecting counterforce against the pressing force applied to the machining tool, and arithmetical operation means for calculating moment about the center of gravity of the machining tool by apparently shifting a position at which the counterforce is detected by the detection means to the center of gravity of the machining tool so as to calculate the pressing force to be applied from the machining tool to the work.

In the force control robot corresponding to the second feature, by the operation means, there can be obtained correct pressing force applied from the machining tool to the work based on the moment about the gravity of the machining tool.

Generally, the machining tool is pressed against the work in a fixed posture and a fixed direction, moreover, the area where the machining tool contacts with the work is substantially decided.

Therefore, the pressing force F can be obtained by the following equation with the moment MG about the center of gravity of the machining tool to be detected by the detection means and the vertical distance r from the center of gravity:

$$F = M_\alpha / r \qquad (1)$$

While, since the pressing force is controlled, even when some inertia force acts on the machining tool, that is, even when acceleration $\alpha$ is generated in the pressing direction of the machining tool, the moment $M_\alpha$ about the center of gravity is completely not influenced by the inertia force $m\alpha$ (m is the mass of the machining tool).

Accordingly, since it is possible to detect the pressing force correctly without any influence of the inertia force, the work can be machined with high accuracy by the machining tool based on the pressing force correctly detected.

Thus, there can be provided a force control robot which has excellent response ability for the force control and can carry out high accuracy control operation.

Since the pressing force is detected based on the moment $M_\alpha$ about the center gravity of the machining tool, the weight compensation for the machining tool is unnecessary even when the posture of robot is variously changed.

Moreover, a third feature of the present invention is a force control robot which detects pressing force to be applied from a machining tool provided at the distal end of the robot arm to a work to be machined, then controls the detected pressing force to be taget pressing force, in which are provided detection means for detecting counterforce of the pressing force of the machining tool, and compensation means for obtaining moment about the center of gravity of the machining tool from the detection result of the detection means and further obtaining counter force of the pressing force from the moment so as to compensate the detection result.

Moreover, the compensation means arranges both of the position of the center of gravity in the machining tool and the detection position thereof to be the same by attaching a counterweight to the machining tool.

Accordingly, the detection result can be compensated by the compensation means based on the pressing force applied from the machining tool to the work.

As the result, since it becomes possible to detect correct pressing force, it also becomes possible to press the machining tool against the work based on the correctly detected pressing force.

Moreover, by attaching the counterweight to the machining tool, the detected pressing force of the machining tool can be compensated.

Next, a fourth feature of the present invention is a control apparatus for controlling a force control robot, which detects pressing force to be applied from a machining tool provided at the distal end of the robot arm to a work to be machined, then controls the detected pressing force to be target pressing force, in which are provided detection means for detecting counterforce of the pressing force of the machining tool, posture change means for changing the posture of the machine tool so as not to change the detection result from a predetermined value, and driving means for pressing and moving the machining tool in the direction along which the tool is fixed.

According to the control apparatus, the center of rotation of the posture control for the machining tool is exsistent in the vicinity of the contact point between the machining tool and the work to be machined.

Moreover, the posture of the machining tool is changed by the posture change means so as not to change the detection result of the detection means from a predetermined value.

Furthermore, the machining tool is pressed and moved by the driving means in the direction along which the machining tool is fixed.

Besides, because the center of rotation of the posture control for the machining tool is arranged in the vicinity of the contact point between the tool and the work to be machined, the posture control is carried out round the contact portion.

While, a fifth feature of the present invention is a force control apparatus for controlling a robot, which detects pressing force to be applied from a machining tool provided at the distal end of the robot arm to a work to be machined, then controls the detected pressing force to be target pressing force, in which are provided first shape memory means for memorizing the shape of the work from the movement orbit of the machining tool, second shape memory means for memorizing the finished shape of the work, and operation means for carrying out arithmetical operation of a target position and a target posture of the machining tool based on the shapes memorized in both of the first and the second shape memory means.

Namely, in this force control apparatus, a shape of the work to be machined is memorized in the first shape memory means based on the movement orbit of the machining tool. While, a finished shape of the work is memorized in the second shape memory means. Moreover, a target position and a target posture are obtained by means of the operation means based on the shapes which memorized in both of the first and the second shape memory means.

Generally, in a force control robot, when some machining process is given to a work, the pressing or moving direction of the machining tool and its posture to the work are approximately decided. For example, in grinding work by means of a usual disk grinder (so-called angle grinder), the pressing direction is a normal of the work, and the moving direction is a tangent thereof. While, with respect to the posture of the machining tool to the work to be machined, the pitch angle is 20° to 30° and the roll angle is 90°.

Accordingly, on the grinding work, with respect to a work whose shape is already known, the operational direction and posture of the force control robot are controlled by the force control apparatus relating to the first to the third feature of the present invention.

However, with respect to a work whose shape is not known, it is impossible to decide the posture and the like.

To solve this problem, this control robot is controlled by the force control apparatus of the above-described fouth feature of the present invention. Namely, the pressing and the moving direction of the machining tool are not decided based on the work, but are decided based on the machining tool itself. Namely, the robot is so controlled that the machining tool is moved along the surface of the work by moving the tool in a predermined pressing direction, further by moving it in the vertical direction to the pressing force.

However, the above means is insufficient to carry out the control operation for intentionally changing the posture of the machining tool so as to keep it in a constant state with respect to the work whose shape is not known.

In the force control apparatus of the fifth feature, for example, in case that the pressing direction is not in accord with the normal direction of the work, and the machining tool is always moved in a predetermined pressing direction and is also moved in the vertical direction to the pressing direction, the pressing force and the moment generated thereby are largely changed as compared with the case in which the pressing direction coincides with the normal direction. To the contrary, in case that the pressing direction coincides with the normal, the pressing force and the moment caused thereby are not changed so largely.

Accordingly, by detecting the change and adjusting the posture of the machining tool so that the change can be ignored, the pressing direction can be arranged to coincide with the normal of the work.

Then, if the posture of the machining tool can be changed so as not to generate the change of the pressing force or the like, even though the surface of the work is curved three-dimensionally, the posture of the machining tool to the work can be kept in a constant state. Therefore, the machining tool can be moved in accordance with the surface shape of the work with being kept pressed with a predetermined force against the work even when the shape thereof is not known.

Moreover, by memorizing machining data on the work whose shape is not known, it becomes possible to recognize the shape of a new work, and also to finish the surface thereof in any desired shape.

These and other objects, features and advantages of the present invention will be more apparent from the following description of a preferred embodiment, taken in conjunction with the accompanying drawings.

BRIEF DESCRIPTION OF THE DRAWINGS

FIG. 13b is a side view of the machining tool shown in FIG. 13a;

FIG. 14b is a side view of the machining tool shown in FIG. 14a;

FIG. 14c is a front view of the machining tool shown in FIG. 14a;

FIG. 15b is a side view of the gripper shown in FIG. 15a;

FIGS. 16 to 21 are graphs to respectively show experimental results concerning pressing force in the second embodiment;

FIGS. 22, 22a and 22b are block diagrams showing a force control apparatus as fourth modification of the second embodiment;

FIG. 25 is a perspective view to show a work of planar structure;

FIG. 28 is a diagram to show relation between time and grinder pressing force;

FIG. 29 is a diagram to show relation between time and a pitch angle; and

FIG. 30 is a diagram to show relation between time and an orbit of the distal portion of a grindstone.

DETAILED DESCRIPTION OF THE EMBODIMENTS

Figure 1:
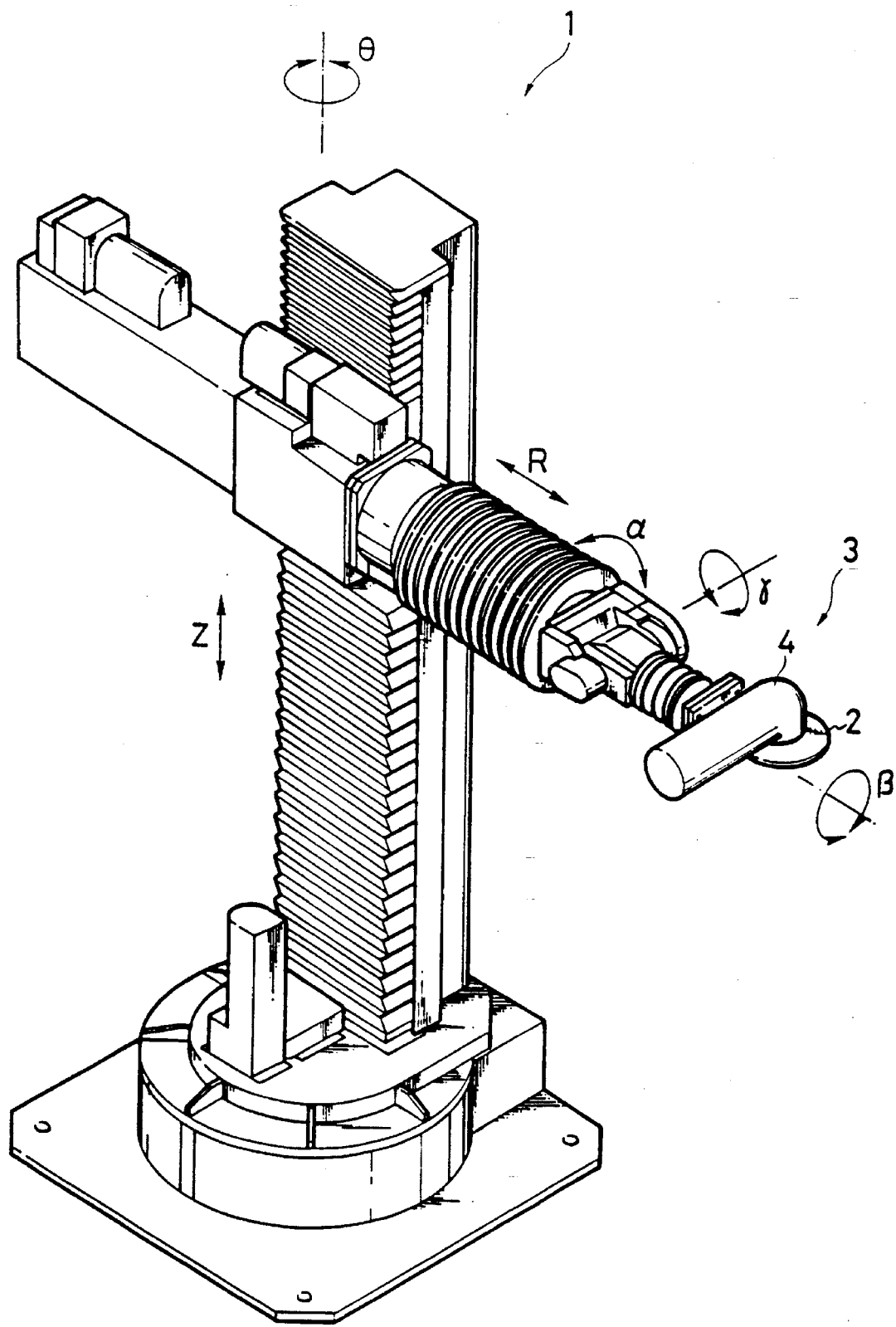
FIG. 1 is a perspective view of a control robot which relates to a first embodiment of the present invention.
Figure 2:
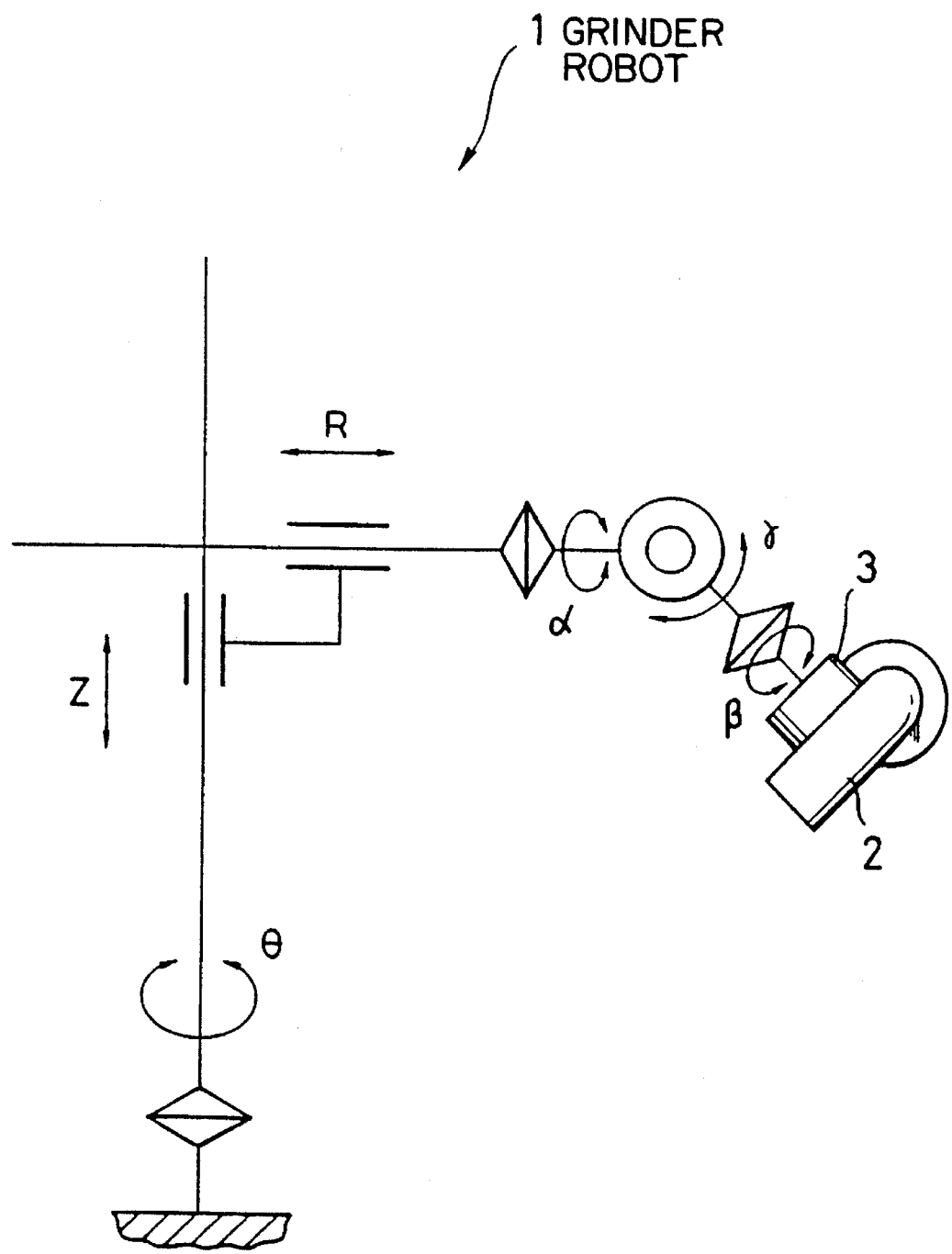
FIG. 2 is an explanatory diagram to show the robot shown in FIG. 1 with diagrammatical signs.

FIG. 1 is a perspective view of a six-shaft control robot as first embodiment of the present invention, which shown in the cylindrical coordinate system. FIG. 2 is an explanatory diagram for showing the robot shown in FIG. 1 with diagrammatical signs.

In these diagrams, a grinder robot 1 has six operational shafts $\theta$, Z, R, $\alpha$, $\gamma$, $\beta$. Among these shafts, the three shafts $\alpha$, $\beta$, $\gamma$ which provided at the distal portion of the robot arm function as posture control shafts for the robot 1, respectively. Incidentally, these three shafts $\alpha$, $\beta$, $\gamma$ respectively comprise rotation shafts for controlling the posture of the control robot 1. In this embodiment, the axial direction of the shaft $\beta$ for controlling the posture of the robot arm is arranged so as not to be the same as the rotation shaft of a rotation tool (grindstone) 2. Moreover, the rotation direction of the shaft $\beta$ is arranged so as to coincide with the pressing direction of the rotation tool (grindstone) 2 to a work, and a grinder (machining tool) 4 is attached to the distal end of the shaft $\beta$ through a six-shaft torque sensor 3.

In more detail, the control robot 1 has standard three shafts $\theta$, Z, R of the cylindrical coordinate system, and at the distal portion of the shaft R are respectively provided the first rotation shaft (rotation shaft of the robot arm) $\alpha$, the swinging shaft $\gamma$, and the second rotation shaft (posture control shaft) $\beta$. Moreover, the grinder 4 is attached to the distal end of the rotation shaft $\beta$ so that the pressing direction of a distal tool 2 of the grinder 4 to a work coincides with the rotating direction of the rotation shaft $\beta$. Incidentally, the weight balance between the grinder 4 and the tool 2 is suitably adjusted by means of a spring or counterweight.

Accordingly, the grinder robot 1 can move the rotot arm to any given space position by operation of the respective standard shafts $\theta$, Z, R. Moreover, by operating the distal three shafts $\alpha$, $\beta$, $\gamma$ with operation of these shaft $\theta$, Z, R, the grinder 4 can be moved any desired position with keeping the posture in a constant state with respect to the work. Namely, the second rotation shaft $\beta$ controls the position and the posture of the grinder 4.

Figure 3:
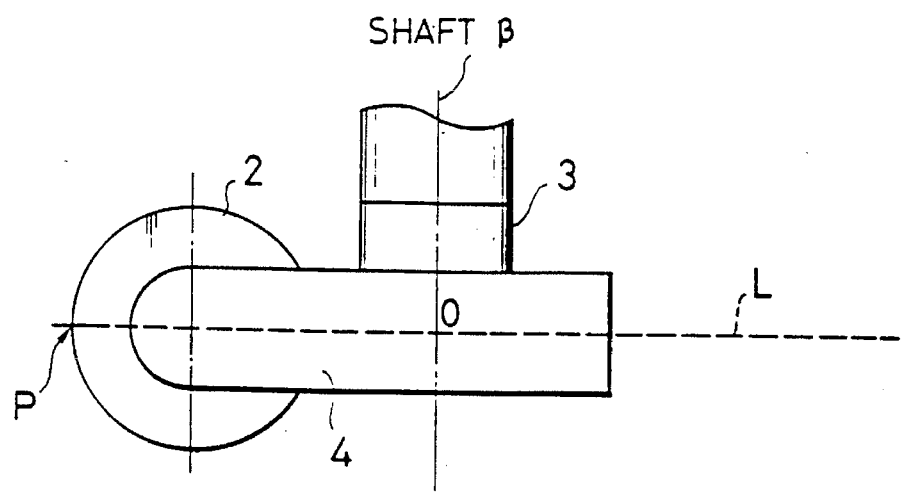
FIGS. 3 and 4 are a plane view and a side view to respectively show an attachment manner of a machining tool in the control robot shown in FIG. 1.
Figure 4:
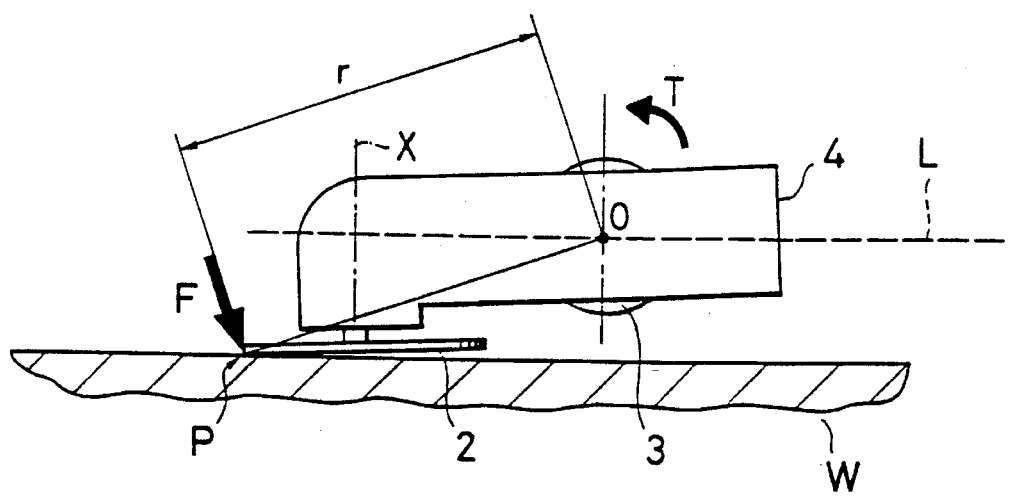

FIGS. 3 and 4 are a plane view and a side view to respectively show the grinder 4 attached to the robot arm shown in FIG. 1.

As shown in these diagrams, the grinder 4 is attached to the shaft $\beta$ through the sensor 3 so as to rotate round the center of gravity (grind centeral point) 0 of the grinder 4 about the shaft $\beta$ and to make the pressing direction of the grind stone 2 to the work W at a point P be the same as the rotation direction of the shaft $\beta$. Moreover, the shaft $\beta$ is so arranged to make 90° with respect to the rotation axis x of the grind stone 2.

When the grind work is carried out by means of custruction shown in FIGS. 3 and 4, the grind central point 0 is moved along a movement orbit which is parallel to the surface of the work W. At the time, when the distance between the grind central point 0 and the machining point P is r, the torque about the shaft $\beta$ is T, and the pressing force to the work W is F, the relation designated by T=F×r is establised. Incidentally, because r is always existent whenever the shaft $\beta$ is arranged about an axis different from the rotation axis x, machining the work W can be certainly carried out in accordance with the formula T=F×r.

As shown in FIG. 4, when the grindstone 2 is a disk grinder, it is difficult to make the pressing direction of the grindstone 2 by means of the rotation of shaft $\beta$ be completely the same as the vertical direction to the work W. However, this problem can be compensated with ease by some arithmetical operation technique.

Figure 5:
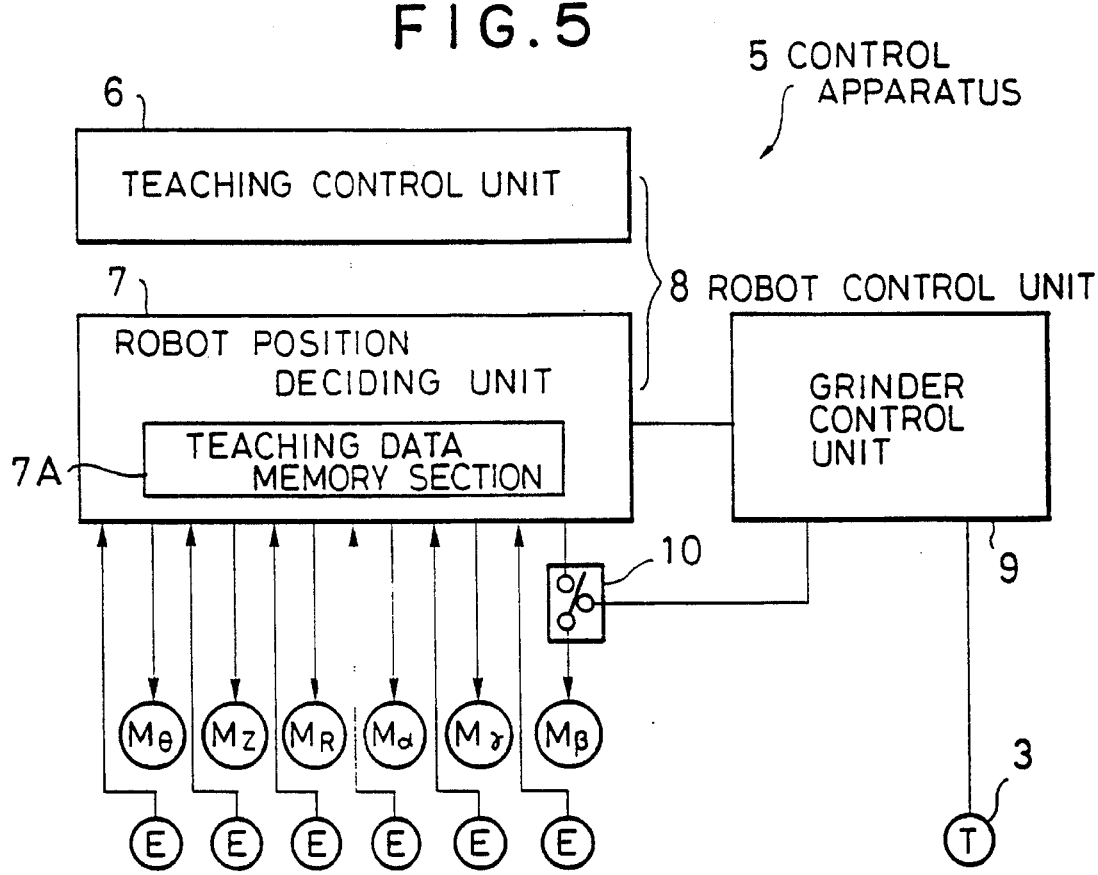
FIG. 5 is a block diagram of a control apparatus in the control robot shown in FIG. 1.

FIG. 5 is a block diagram to show an embodiment of a control apparatus for the control robot shown in FIG. 1.

In the same drawing, a control apparatus 5 for the grinder robot 1 comprises a robot control unit 8 comprising a teaching control unit 6 and a robot position deciding unit 7, and a grinder control unit 9.

The robot control unit 8 obtains teachings at the teacing control unit 6, then drives servo motors $M_\theta$, $M_Z$, $M_R$, $M\alpha$, $M_\gamma$, $M_\beta$ respectively corresponding to each shaft based on teaching data memorized by a teaching data memory section 7A. Moreover, each servo motor is provided with a rotary encoder E for detecting each shaft position. Besides, a speed detector is also provided therein.

Between the robot position deciding unit 7 and the servo motor $M_\beta$ for driving the second shaft β, a switch circuit 10 is provided.

On the other hand, with respect to the grinder control unit 9, the above-described six-shaft torque sensor 3 and switch circuit 10 are connected.

The switch circuit 10 is so constructed as to connect the servo motor $M_\beta$ to the robot position deciding unit 7 on teaching, while to the grinder control unit 9 on griding work.

Accordingly, on teaching, the control apparatus 5 can carry out ordinary teaching work by using the six shafts θ, Z, R, α, γ, β so as to make the memory section 7A memorize teaching data and reproduce them when necessary. While, on grinding work, the apparatus 5 can carry out torque control as described below by switching the servo motor $M_\beta$ to the grinder control unit 9.

As one example of torque control, there is a method of controlling the torque T about the shaft β shown in FIG. 4 to be constant by controlling the current to be applied to the motor $M_\beta$ based on a corresponding part of data detected by the six-axes force/torque sensor 3. However, since the machining accuracy can not be necessarily guaranteed enough only by such constant torque control, it is also possible to use compliance control for generating torque proportional to the deviation on the basis of a predetermined position of the machining point P.

Moreover, it is also possible to provide some positional threshold value so that the constant torque control is used when the deviation is below the threshold value, while the compliance control is used when it exceeds the value. Moreover, it is possible to use hybrid control.

Figure 6:
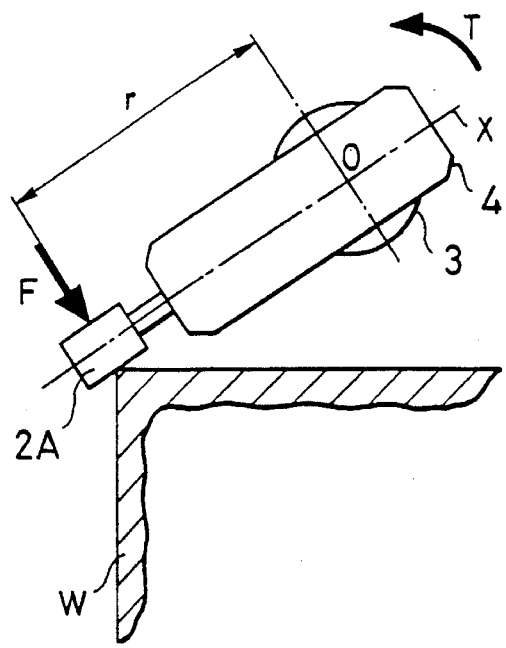
FIGS. 6 to 8 are explanatory diagrams to respectively show working states of the control robot shown in FIG. 1.

FIG. 6 shows an explanatory diagram of fettling or surface finishing work.

As shown in the same drawing, this control apparatus can be applied to such fettling or surface finishing work by changing the grind stone 2 into another 2A with a shape suitable for this work. In the example shown in FIG. 6, the grindstone 2A is formed in a small cylindrical shape, and rotates round the rotation axis x so that the cylinder surface is in contact with an edge portion of the work W to be machined.

When such a grindstone 2A as shown in the drawing is used, the pressing direction of the grindstone 2A by means of the shaft β can coincide with a direction in which the machining to the work W can be effected most efficiently, moreover, the shaft β can be arranged about an axis different from the rotation axis x. Incidentally, in the same drawing, the proceeding direction of the grindstone 2A is vertical to the drawing paper.

Figure 7:
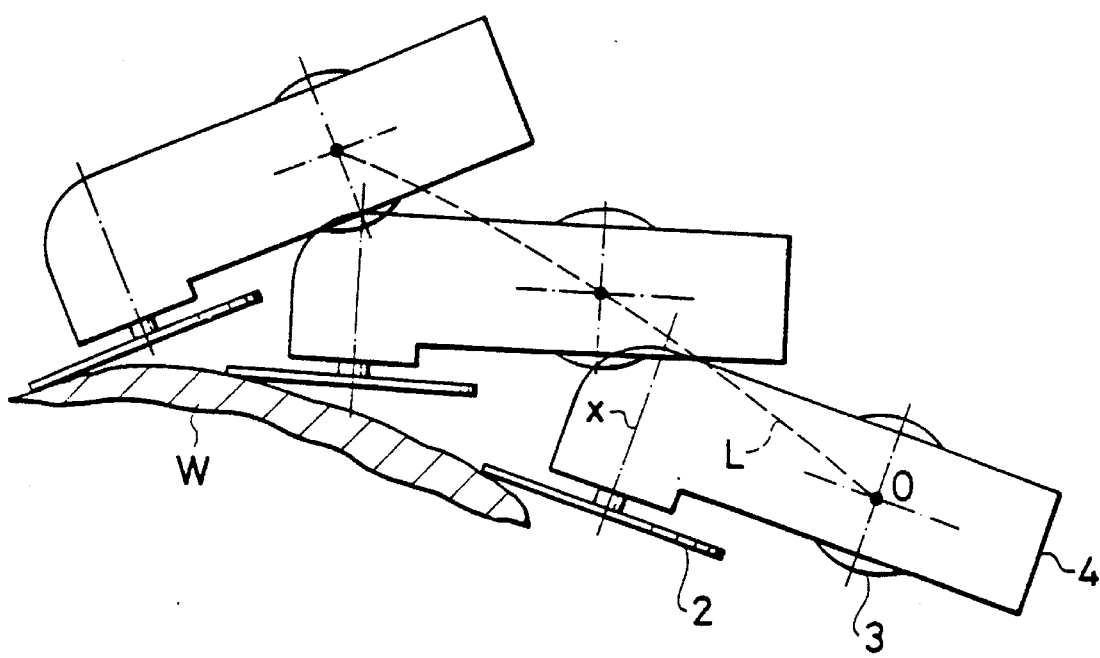

Moreover, as shown in FIG. 7, when the machine surface of the work W is curved, it is possible to operate the robot control apparatus 8 so that the grind central point 0 moves on an orbit L along the curved surface and to carry out the torque control concerning the shaft β.

Figure 8:
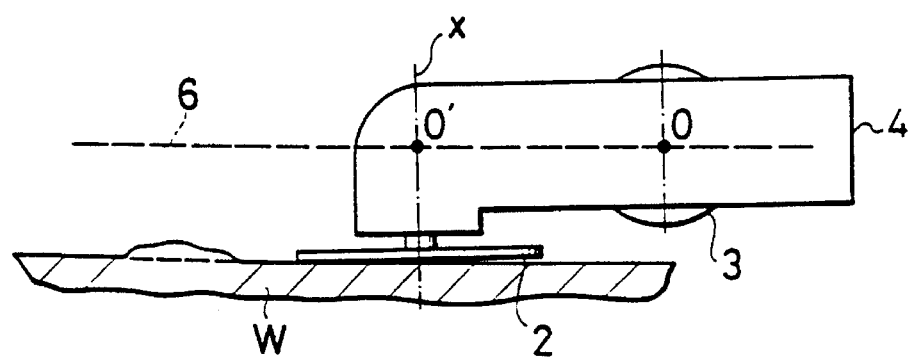

Also as shown in FIG. 8, in case that the work is grinded in an optional shape, an orbit of a tool standard point 0' is made into an orbit 6 which is substantially parallel to an target shape, and the positions and speeds of the other shafts than the shaft β are respectively controlled so that the grinder 4 gets a target posture with respect to the work W. While, with respect to the shaft β, for example, by carring out the compliance control the work can be finished into an optional shape. Otherwise, it is also possible to carry out the torque control untill the posture reaches a suitable angle with respect to a targert angle, thereafter, the torque control is switched into the positional control so as not to grind the work excessively.

As stated above, in the grinder robot of the first embodiment, since the torque control is carried out by one shaft, i.e. the control shaft β, provided at the distal portion of the robot arm, the inertia and rigidity of the shaft β are not changed by the posture thereof. Therefore, it is possible to always carry out the torque control under the same condition. Moreover, since the inertia force caused by the shaft β is small and the characteristic frequency thereof is high as compared with the three standard shafts, it becomes possible to improve the response ability to the work irrespectively of vibration of the other shafts caused by the positional and speed control. Accordingly, the machining work including grinding work can be carried out with high accuracy.

As compared with a case where the force control or compliance control is carried out with respect to a plurality of or all of control shafts, only one shaft is controlled in this case. Therefore, even when carried out at a high level, the control of this case does not require complex and a large amount of calculation, so that the calculation amount can be largely reduced.

Incidentally, though the six-axes force/torque sensor 3 is used as torque sensor in the first embodiment, when there is almost no possibility that considerably large force is generated in another direction than the machining direction, it is possible to provide only one torque sensor for detecting the torque of shaft β. In this case, since only one sensor is provided in the system, the size of robot arm can be much reduced, moreover, it is also possible to provide the sensor in a joint of the arm. Besides, the cost can be much reduced.

Moreover, in the first embodiment, the present invention is applied between the shaft β and the grinder 4, however, it is also possible to apply it between the shaft α and the grinder 4, or the shaft γ and the grinder 4.

Furthermore, in the above embodiment, the torque on machining is directly detected by the torque sensor, it is also possible to indirectly detect the torque by means of the current value of grinder 4, rotation number of grindstone 2 or current value of the driving motor.

Besides, in the above embodiment, the present invention is applied to the robot of cylindrical coordinate system with the standard shafts θ, Z, R, however, it is also possible to apply it to a robot of rectangular coordinate system, polar coordinate system or multi-joint type.

As stated above, according to the first embodiment, there can be provided a control robot which has easy construction, and can control robot work, for example, complex grinding work with ease.

Next, a second embodiment of a force control robot related to the present invention will be described.

Figure 9:
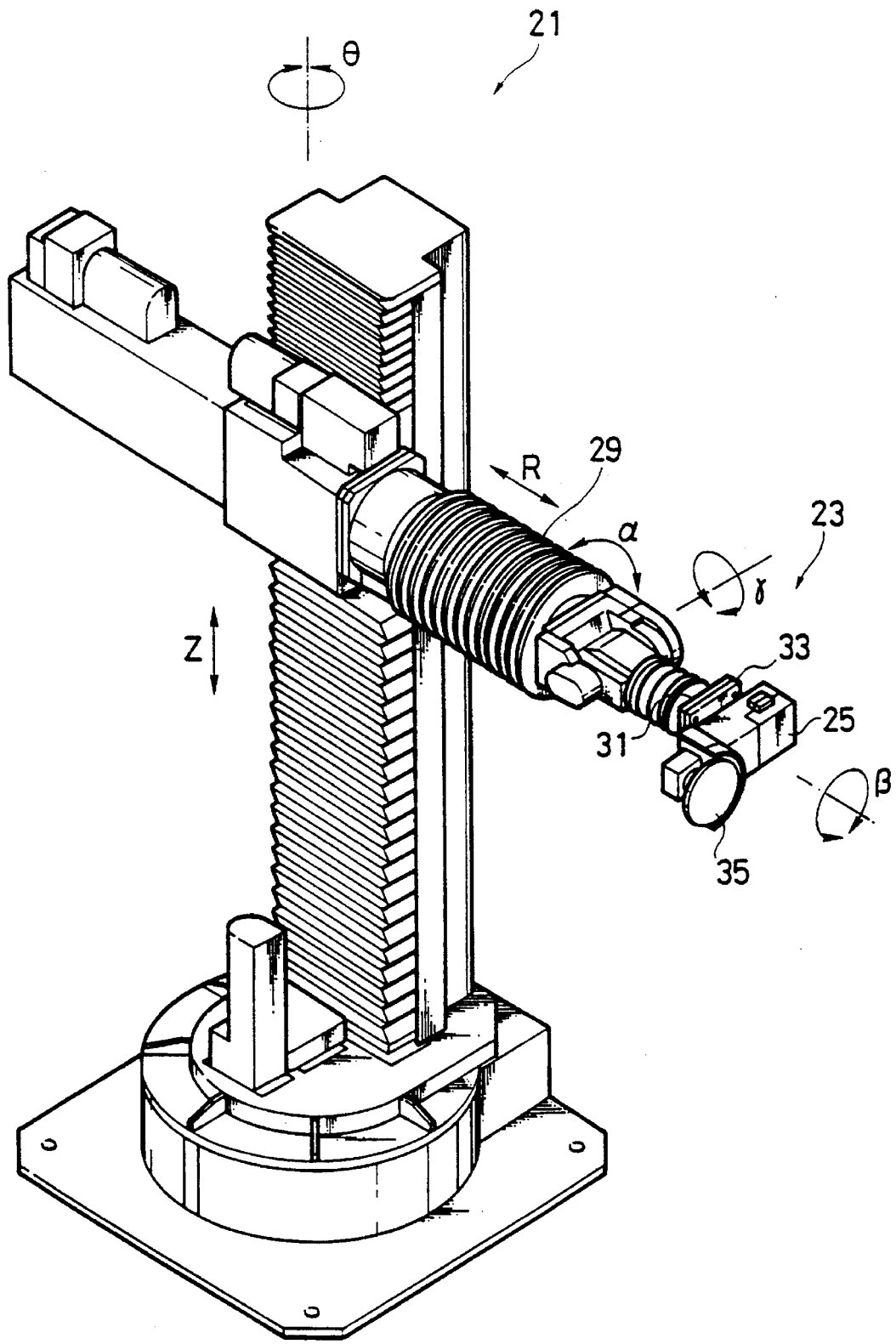
FIG. 9 is a perspective view of a second embodiment of a force control robot according to the present invention.

FIG. 9 shows a force control robot 21 of the second embodiment. The force control robot 21 is a six-shaft robot of cylindrical coordinate system, and has six operational shafts Z, R, θ, α, β, γ. Moreover, at the distal portion 23 of the force control robot 21, a grinder 25 is attached as machining tool for grinding a work 27 shown in FIG. 10.

Between the arm 29 of the force control robot 21 and the grinder 25, a six-shaft force sensor 31 is provided. Further, between the six-shaft force sensor 31 and the grinder 25, a rubber damper 33 for cutting off high frequency vibration of the grinder 25 is disposed.

Figure 10:
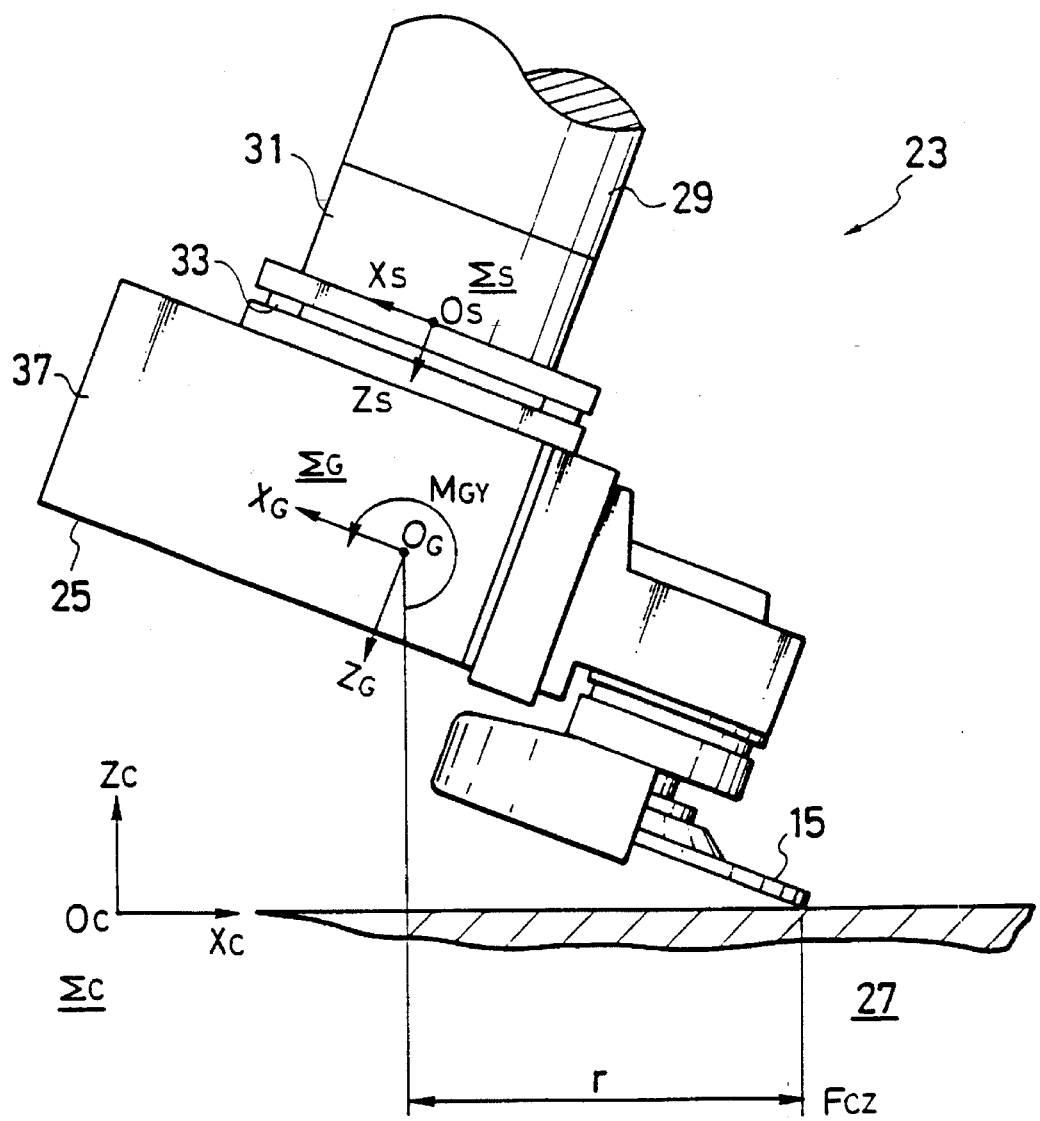
FIG. 10 is a side view to show a machining tool of the force control robot shown in FIG. 9.

While, as shown in FIG. 10, the grinder 25 disposed at the arm distal portion 23 rotates a disk grindstone 35 with a motor 37 to grind the surface of work 27. In this case, the grindstone 35 is inclined by a predetermined angle with respect to the surface of work 27, and moves thereon.

Incidentally, in FIG. 10, there are respectively provided a coordinate system $\Sigma_C$ comprising the normal direction $Z_C$ to the work 27, movement direction $X_C$ of the grinder 25 and the lateral direction $Y_C$ of the grinder 25, which is along the surface of work 27; a sensor coordinate system $\Sigma_S$ and a grinder coordinate system $\Sigma_G$ comprising parallel shift of $\Sigma_S$ to the center of gravity of the grinder 25. Moreover, in FIG. 10, the center of gravity of the grinder 25 is designated by OG and the distance from the contact portion between the grindstone 35 and the work surface to the center $O_G$ of gravity is expressed by r.

When the surface of work 27 is subjected to grinding, generally, the grinder 25 is pressed against the work 27 in the normal direction $Z_C$ with being inclined to the work 27 at a predetermined contact angle.

Accordingly, the relation of counterforce $F_{CZ}$ against the pressing force of the grinder 25, moment $M_{GY}$ about the center $O_G$ (in this case $Y_G$) of gravity detected by the sensor 31, and vertical direction r from the center $O_G$ of gravity to $F_{CZ}$ is expressed by the following formula:

$$M_{GY} = F_{CZ} \times r \qquad (2)$$

Namely, by detecting the moment $M_{GY}$ about the center $O_G$ of gravity, the counterforce $F_{CZ}$ agaist the pressing force from the grinder 25 to the work 27 can be calculated based on the formula (2).

Figure 12:
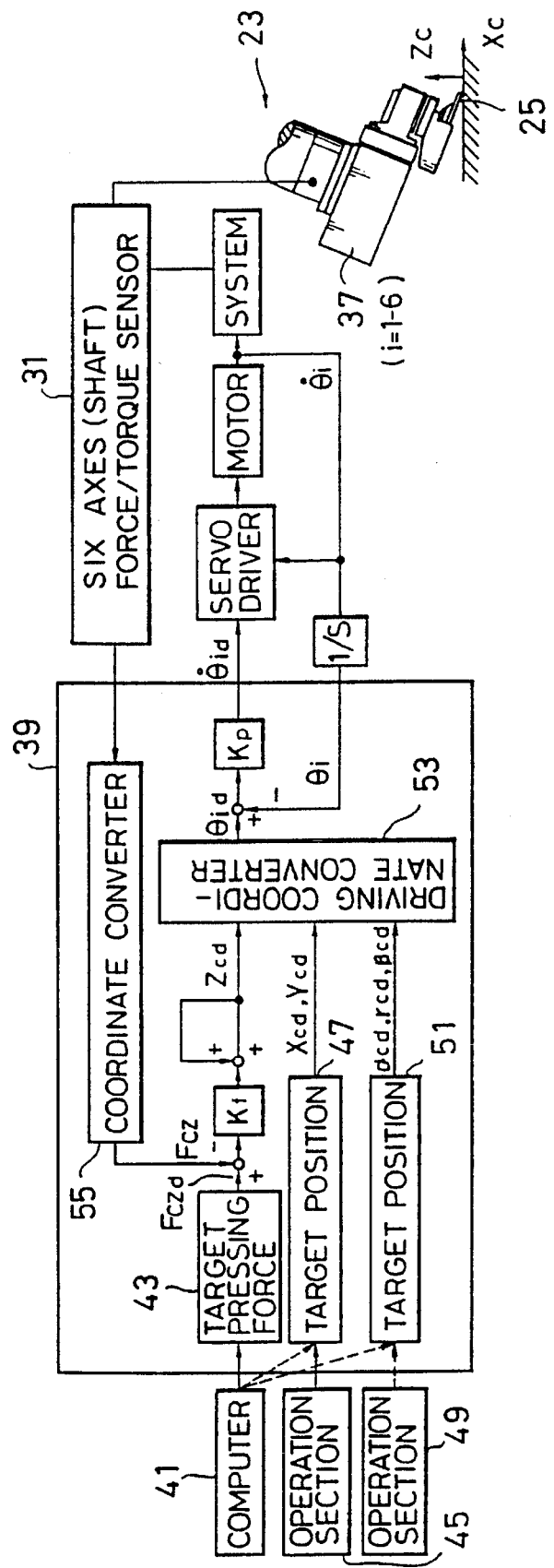
FIG. 12 is a block diagram to show construction of a force control apparatus shown in FIG. 9.

Next, a force control apparatus 39 for controlling the force control robot 21 is explained. FIG. 12 is a block diagram to show construction of the force control apparatus 39.

In the force control apparatus 39, there are provided a target pressing force output section 43 for outputting target pressing force to a driving coordinate converter when the target pressing fource to be applied from the grinder 25 to the work 27 is inputted from a computer 41, a target position output section 47 for outputting a target position when the target position is inputted from an operation section 45 such as joy stick, and a target posture position output section 51 for outputting a target posture position when the target posture position is inputted from an operation section 49.

Namely, in the force control apparatus 39, a target pressing force output signal is inputted from the target pressing force output section 43, while, a target position signal is inputted from the target position output section 47, moreover, a target posture position signal is outputted from the target posture position output section 51. Besides, a coordinate converter 53 for outputting a target angle $\theta_{id}$ of each joint to a servo driver and a motor is also provided therein.

Furthermore, a coorinate converter 55 for obtaining moment about the center of gravity of the grinder 25 from force signals on directions of the six shafts detected by the six-shaft sensor 31, then outputting a predetermined pressing force based on the moment about the center of gravity.

In detecting the moment about the center of gravity of the grinder 25, the original point $O_S$ of the six-shaft sensor 31 can be apparently moved to the center $O_G$ of gravity of the grinder 25 by coordinate transformation based on offset between the original point $O_S$ of sensor 31 and the center $O_G$ of the gravity of the grinder 25 in the respective shaft directions, and force applied in the respective shaft directions and detected by the sensor, and moment about the respective shafts. In this case, the moment $M_{GY}$ about the center $O_G$ of gravity can be expressed as follows by using factors $M_{SY}$, $F_{SZ}$, $F_{SX}$, $Z_{GS}$, $X_{GS}$:

$$M_{GY} = M_{SY} + F_{SZ} \cdot X_{GS} - F_{SX} \cdot Z_{GS} \qquad (3)$$

wherein, $M_{SY}$, $F_{SZ}$, $F_{SX}$ respectively designate moment about the Y axis in the sensor coordinate system, and force in the Z axis and the X axis direction, and $Z_{GS}$, $X_{GS}$ respectively designate distances between the sensor origin and the center $O_G$ of gravity of the grinder 25 in the Z axis and the X axis direction. Incidentally, these attached signs should be changed by construction of the coordinate system.

Moreover, the moment about the other axes can be obtained as follows in the same manner:

$$M_{GX} = M_{SX} + F_{SY} \cdot Z_{GS} - F_{SZ} \cdot Y_{GS} \qquad (4)$$

$$M_{GZ} = M_{SZ} + F_{SX} \cdot Y_{GS} - F_{SY} \cdot X_{GS} \qquad (5)$$

When the surface of work 27 is uniformly grinded by pressing the grinder 25 against the work 27 in the normal direction thereof at a predetermined force, it is necessary to move the grinder 25 along the surface of the work 27.

In this case, a work coordinate system $\Sigma_C$ along the surface of work 27 is determined, and a target position $Z_{CD}$ is given in the direction $Z_C$ so that the pressing force $F_{CZ}$ in the normal direction of the work 27 detected by the force torque sensor coincides with target pressing force $F_{CZd}$ outputted from the target pressing force output section 43. Namely, this relation can be expressed as follows:

$$Z_{cd(n)} = K_f(F_{czd} - F_{cz}) + Z_{cd(n-1)} \qquad (6)$$

wherein $Z_{cd(n-1)}$ is a target position of the previous sampling. Naturally, $F_{cz}$ shown here is detected from the moment applied about the center $O_G$ of gravity of the grinder 25.

With respect to the directions $X_C$, $Y_C$ along the work 27, the target position is given by joy stick or other suitable calculation methods, while to posture factors $\alpha_C$, $\beta_C$, $\gamma_C$ of the grinder 25, it is obtained so as to keep a predetermined angle to the work 27.

Accordingly, when the detected pressing force does not satisfy the target pressing force, a new target position is given to the work 27 again until it coincides with the traget pressing force.

While, with respect to the other directions, when positional control is completed, the grinder 25 is moved in parallel with the pressing direction thereof.

When target positions $X_{cd}$, $Y_{cd}$ along the surface of work 27 are already fixed, the pressing can be carried out with keeping the position. Moreover, it also possible to move the grinder 25 at an optional speed along the surface of work 27 by giving the target positions $X_{cd}$, $Y_{cd}$ by means of suitable joy stick or calculation.

Moreover, target posture values a $\alpha_{cd}$, $\beta_{cd}$, $\gamma_{cd}$ of the grinder 25 are given so that the grinder 25 keeps a constant posture to the work. If the work is in a planar shape, $\alpha_{cd}$, $\beta_{cd}$, $\gamma_{cd}$ are constant, and if in a curved shape, $\alpha_{cd}$, $\beta_{cd}$, $\gamma_{cd}$ should be respectively changed in accordance with the surface shape.

For example, when the grinding work is manually carried out, by arranging the coordinate axes of joy stick to be corresponding to the coodinate system of the work along its surface, the grinding work can be carried out with pressing the grinder against the work at a predetermined force only by operating two-dimensional joy stick even when the surface of the work is variously curved.

While, in case of automatic grinding work, it is possible to grind an optional area of the work 27 by preparing orbits $X_C$, $Y_C$ on the surface of work 27.

Next, operation of the second embodiment is explained. First, target pressing force is outputted from the computer 41 to the target pressing force output section 43. Then, the target pressing force $F_{Czd}$ outputted from the target pressing force output section 43 is compared with counterforce $F_{Cz}$ outputted from the coodinate converter 55 by an adder. At the time, when there is some difference between the counterforce $F_{Cz}$ and the target pressing force $F_{Czd}$, the target position $Z_{Cd}$ is changed so as to make the difference negligible.

In this case, to the coordinate converter 55, output from the six-shaft force sensor 31, that is, moment about the center $O_G$ of gravity detected by the sensor 31 is inputted. To detect the moment about the center OG of gravity, the coodinate transformation is carried out in accordance with the formulas (3) to (5) with offset data between the origin $O_S$ of the six-shaft force sensor 31 and the center of gravity of the grinder 25 with respect to the respective shafts, force data detected by the six-shaft sensor 31 to the respective shafts, and moment data to the respective shafts. As the result, the origin of the six-shaft force sensor 31 can be apparently moved to the center $O_G$ of gravity of the grinder 25.

Then, the pressing force is outputted to the driving coordnate converter 53 so as to machine the work 27 by the grinder 25 at the target pressing force. Based on the target pressing force, the servo drive operrates the motor in a not-shown joint drive mechanism, so as to press the grinder 25 against the work 27.

Accordingly, it becomes possible to press the grinder 25 against the work 27 at the perdetermined target pressing force, thereby improving the response ability concerning force control. Moreover, the machining accuracy of the grinder 25 against the work 27 can be much improved.

Next, experimental results on the second embodiment are explained with reference to FIGS. 16 and 17. In the experiment, influence on the inertia force which differently detected was investigated.

FIG. 16 is a graph to show the counterforce $F_{Cz}$ corresponding to the pressing force and detected by the six-shaft force sensor 31 when step input concerning the vertical speed is given in the non-contact state in the force control robot shown in FIG. 10.

Therefore, since in the non-contact state, the pressing force does not effect from the grinder 25, however, by the step input concerning the vertical speed, inertia force is generated from the grinder 25. FIG. 16 shows a case where the force effecting in the vertical direction is directly detected. Of course, in this case, the force applied in the vertical direction is directly detected, thus the inertia force of the grinder 25 generated by the speed step input is also detected.

Actually, in case that pressing force of about 1 to 2 kg is detected, the inertia force detected together therewith is far larger than the pressing force.

While, FIG. 17 shows a case where the pressing force is detected based on moment effecting about the origin of the sensor. As shown in the same drawing, since some deviation is existent between the origin $O_S$ of the sensor and the center $O_G$ of gravity of the grinder, the rotation inertia generated by the deviation is detected to some extent. However, the influence of inertia force is very small as compared with the case shown in FIG. 16.

Figure 18:
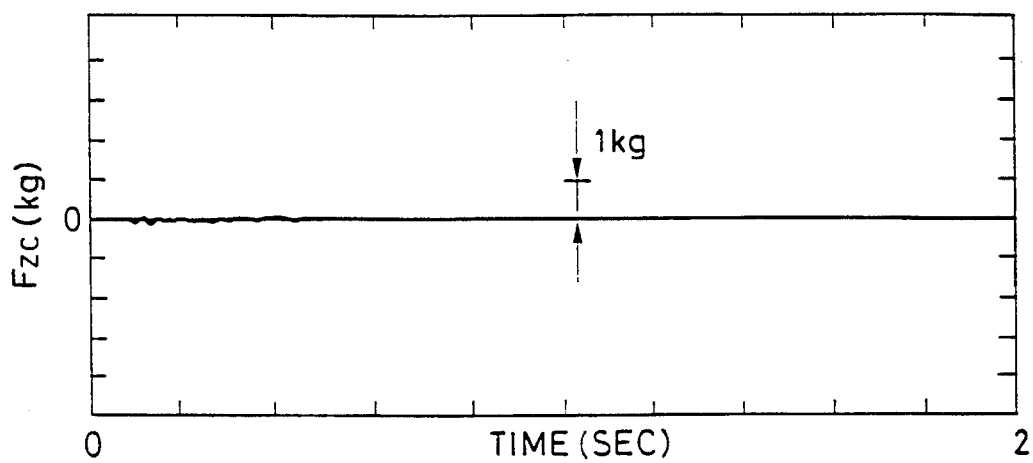

Moreover, according to the second embodiment, as shown in FIG. 18, since the origin of the sensor 31 coincides with the center of gravity of the grinder 25, almost no influence of inertia force is seen.

FIG. 18 shows a case where the moment about the center $O_G$ of gravity of the grinder 5 is detected based on the formula (3) without using a counterweight 37 which will be described below (see FIG. 13). Also in this case, the influence of inertia force can not be seen, moreover, since no counterweight is provided, the weight of the grinder portion is very small.

FIGS. 20 and 21 respectively show results of grinding work in which the pressing force is detected by the detection methods in accordance with cases in FIGS. 16 and 18, and the grinding work is respectively carried out with moving the center of gravity parallel to the surface of work so as to make the pressing force coincide with the target pressing force. Moreover, in the respective cases shown in FIGS. 20 and 21, the change of pressing force from the non-contact state to a state where the pressing force reaches 1 Kg is shown. In both of the cases, though the force gain is increased in such extent that oscillation is not generated, the gain in the case shown in FIG. 21 is larger by 20 times than that in the case in FIG. 20. Namely, it is clearly seen that the case in FIG. 21 is far more excellent in the response ability. On the contrary, according to the response ability substantially equivalent to the case shown in FIG. 20, even by a little inclination of the work, the grinder can not sufficiently follow the surface of the work. To the contrary, according to the response ability equivalent to the case in FIG. 21, even if the machining surface is inclined to some extent, the grinder can move correctly along the surface of the work.

Figure 13A:
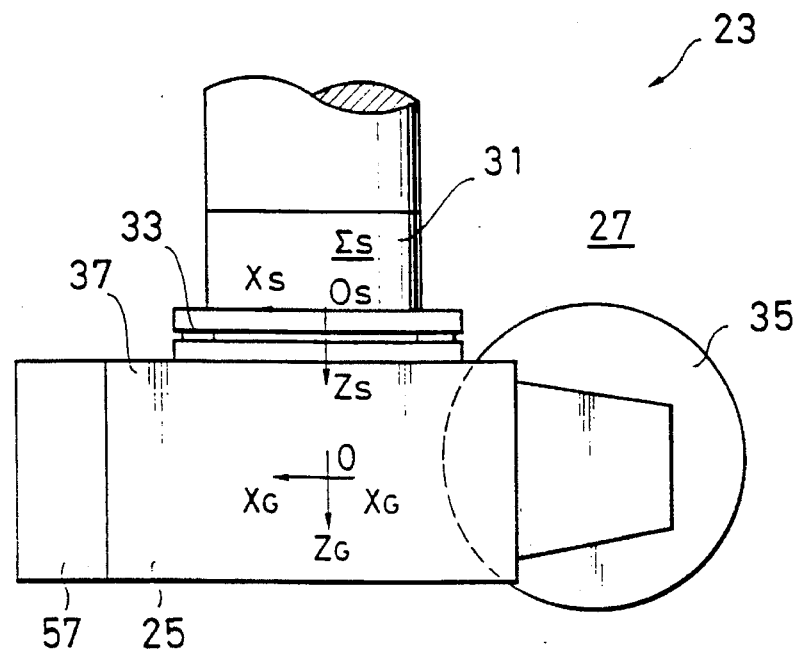
FIG. 13a is a maching tool as first modification of the second embodiment.
Figure 13B:
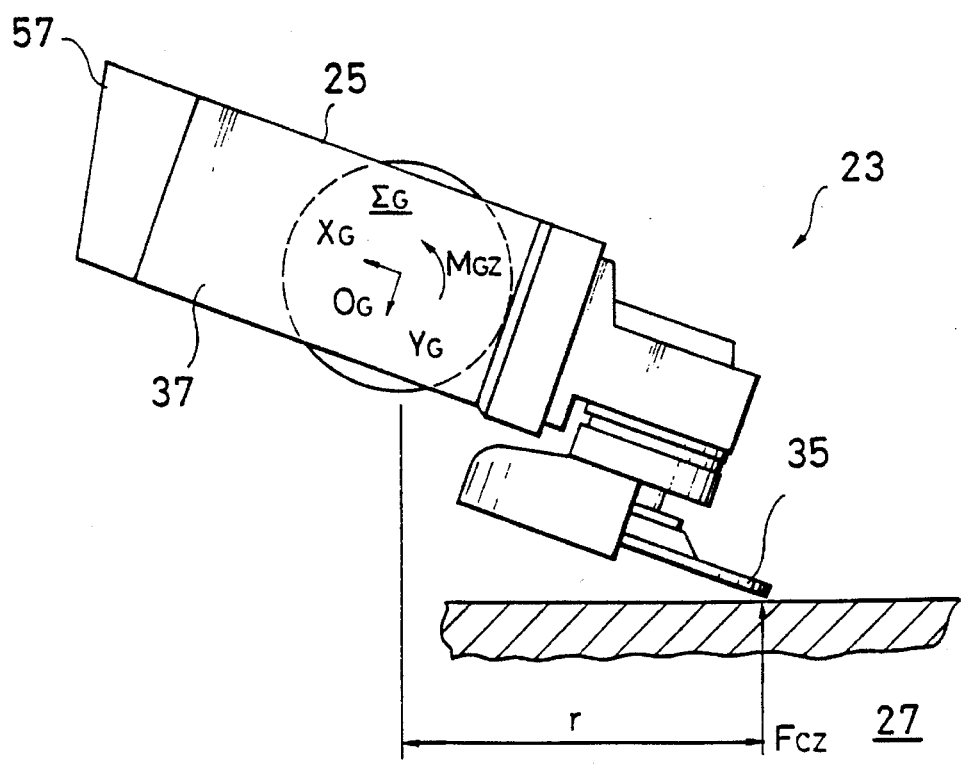

Next, a first modification of the second embodiment of the present invention is described with reference to FIGS. 13a and 13b. In the first modification, a counterweight 57 is attached to the grinder 25 at the distal portion 23 of the robot arm, and the $Z_S$ axis coincides with the $Z_G$ axis so as to directly detect the moment $M_{Gz}$ about the center $O_G$ of gravity of the grinder 25. Otherwise, without attaching the counterweight, the center $O_G$ of gravity of the grinder 25 is directly in accord with the $Z_S$ shaft.

Namely, in the above second embodiment shown in FIG. 10, the center of gravity of the grinder 25 is located on the side of grindstone with respect to the $Z_S$ shaft. Therefore, by attaching the counter weight 57 on the rear side of the motor 37 with respect to the $Z_S$ shaft, the center of gravity of the grinder 25 is shifted in the rear direction along the motor shaft, so that it becomes possible to make the $Z_S$ axis coincide with the $Z_G$ axis by providing the counter weight 57 of a suitable weight.

According to the first modification, $F_{Cz}$ is determined as a counterforce of the pressing force from the grinder 25 to the work 27, therefore, it is necessary to arrange the moment $M_{Gz}$ about the center of gravity of the grinder in accord with the counterforce direction.

On the other hand, when moment is generated about a plurality axis, the axes must be in accord with the original point when occasion demands.

In such a manner, if the axis of the sensor coodinate system can be arranged to be in accord with the axis of the coordinate system of the grinder 25 by adjusting the attachment position of the counterweight 57, the moment about the center of gravity of the grinder 25 can be directly detected.

In this case, when a general six-shaft sensor is used, the attachment method of the grinder 25 is limited, further the total weight is increased by the attachment of counterweight. However, it becomes possible to carry out the control operation without the toublesome arithmetical operation for coordinate transformation with respect to the parallel movement of the origin in the sensor system.

As stated above, also in the first modification, since the moment about the center of gravity of the grinder 25 is detected, the inertia force generated by the transfer of the ginder 25 or by the vibration of the arm does not influence the force control.

Incidentally, the vibration of arm is generated along the movement direction of grinder 25, which is parallel to the work surface, and is hardly generated along the rotation direction thereof. Accordingly, there is almost no case in which the moment about the center of gravity of grinder 25 is vibrated.

Accordingly, the pressing force of grinder 25 can be detected with high accuracy, and the control response ability can be improved.

Next, an experimental result about the first embodiment is explained with reference to FIG. 19.

Figure 19:
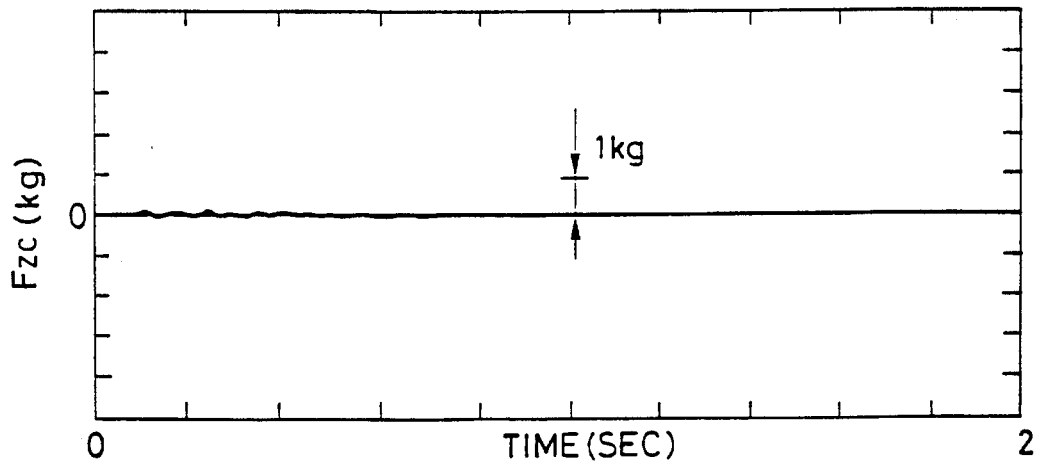

FIG. 19 shows a case in which weight balancing is carried out with providing the counter weight 57 with respect to the origin of sensor system. Moreover, form the same drawing, the influence of the inertia can be hardly seen.

Figure 14A:
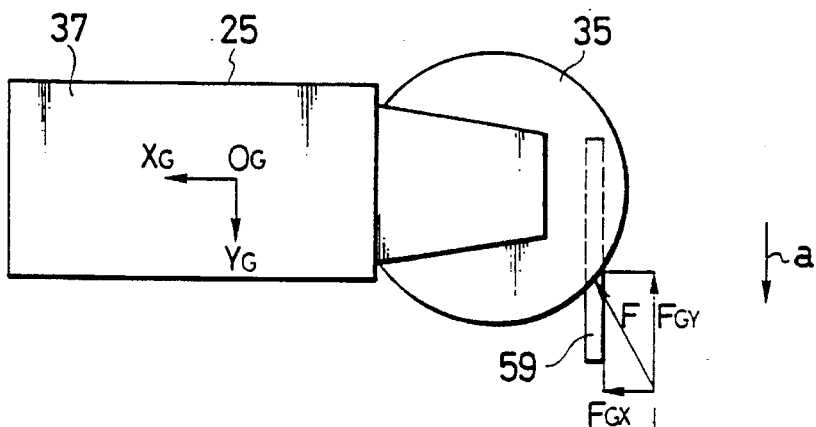
FIG. 14a is a plane view to show a machining tool as second modification of the second embodiment.

Next, a second modification of the second embodiment is explained with reference to FIGS. 14a to 14c. As compared with the second embodiment and the first modification respectively designed for grinding work, the second modification shows a case where a flat plate as a work is cut.

Figure 14B:
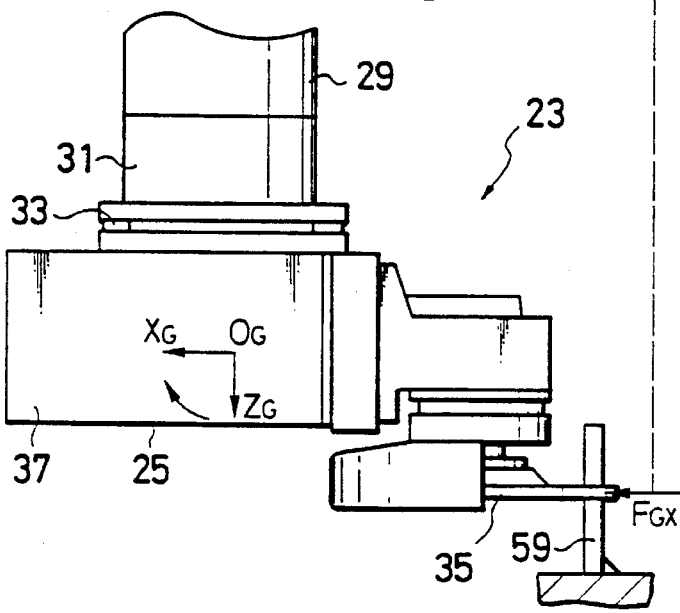
Figure 14C:
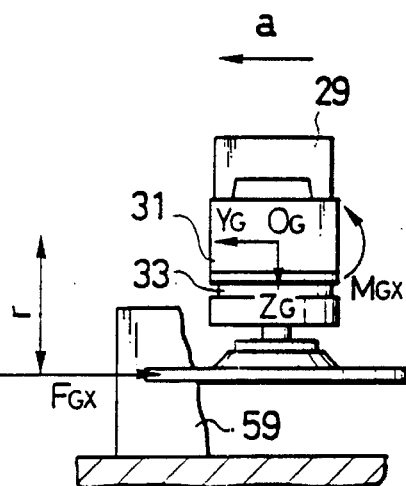

As shown in FIG. 14b, a grindstone 35 of the grinder 25 provided at the distal portion 23 of robot arm serves as a cutter of a flat plate 59. In the cutting work, though the working condition depends on the cutting depth or transfer direction, the grind stone 35 receives counterforce F from the plate 59. The force F can be divided a force component $F_X$ in the direction along the thickness of plate 59 and another force component $F_{GY}$ in the direction along the surface of plate 59.

Since the vertical distance r from the center of gravity of the grinder 25 to the grindstone 35 is constant, the pressing force can be obtained from the moment about the axes $X_G$, $Y_G$ of the grinder 25.

On the other hand, the counterforce F can be calculated as follows:

$$F = \sqrt{(F_{GX}^2 + F_{GY}^2)} \quad (7)$$
$$= \sqrt{((M_{GX}/r)2 + (M_{GY}/r)2)}$$

Also in this case, there is no influence of the inertia force. Therefore, the response ability in the cutting work can be improved as well as in case of the above-mentioned grinding work.

Incidentally, in the respective examples, the present invention is applied to a robot of cylindrical coordinate system, however, it should be understood that this invention can be applied not only to the robot of this type, but also to robots of rectangular coordinate system, polar coordinate system and multi-joint coordinate system.

Moreover, in the respective examples, though the six-shaft force sensor is used as pressing force detection sensor, if the force to be detected is limited to only one direction, it is also possible to use a fource sensor for detecting force in the only one direction.

Accordingly, it becomes possible to construct the control system in a small size at a low cot. Moreover, by using the six-shaft force sensor, emergency stop operation becomes possible when the pressing force becomes excessive.

Figure 15A:
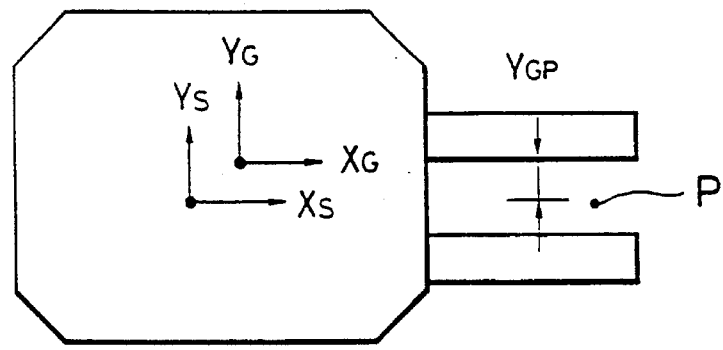
FIG. 15a is a plane view to show a gripper as third modification of the second embodiment.
Figure 15B:
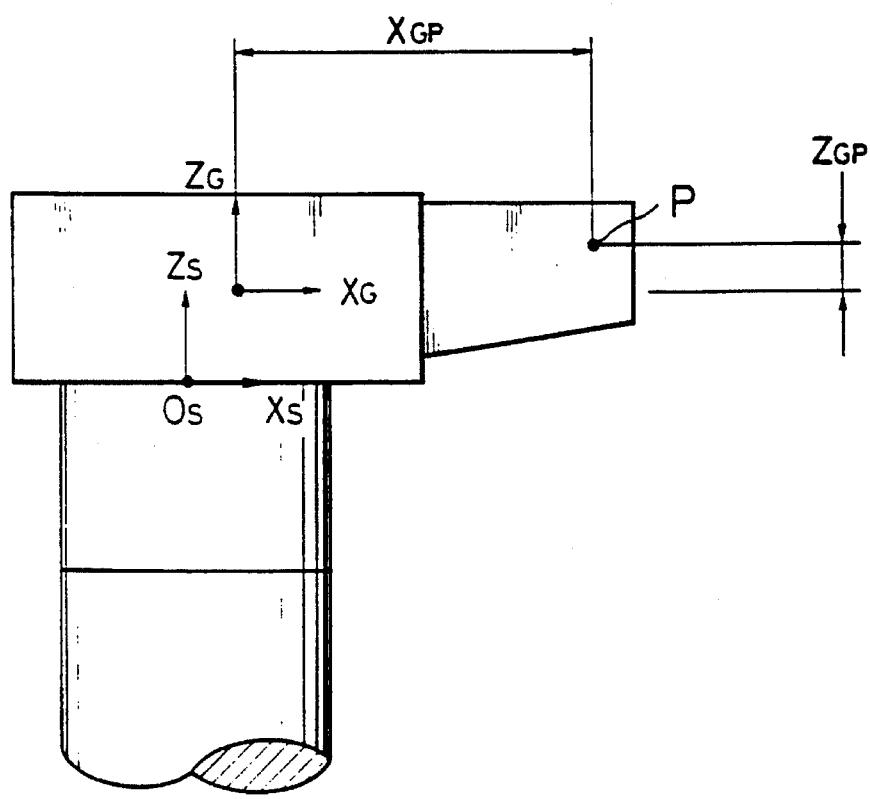

Next, a third modification of the second embodiment is explained with reference to FIGS. 15a and 15b. The third modification is a case where force which acts on a gripper is detected by the present invention.

In this case, respective force components $F_{GX}$, $F_{GY}$, $F_{GZ}$ which act on a pripper portion can be detected by the following famulas (8) to (10) when respective vertical distance components $X_{GP}$, $Y_{GP}$, $Z_{GP}$ from the point P of action of the gripper portion to the origin of sensor system, moment components $M_{GX}$, $M_{GZ}$, $M_{GY}$ about the center of gravity of the gripper, and one of the above force components, for example $F_{GZ}$, are given.

Namely, the relation formulas of the moment components $M_{GX}$, $M_{GZ}$, $M_{GY}$ with respect to the force components $F_{GX}$, $F_{GY}$, $F_{GZ}$ and the distance components $X_{GP}$, $Y_{GP}$, $Z_{GP}$ are as follows respectively:

$$M_{GX}=F_{GZ}Y_{GP}-F_{GY}Z_{GP} \quad (8)$$

$$M_{GY}=F_{GX}Z_{GP}-F_{GZ}X_{GP} \quad (9)$$

$$M_{GZ}=F_{GY}X_{GP}-F_{GX}Y_{GP} \quad (10)$$

Incidentally, these force components $F_{GX}$, $F_{GY}$, $F_{GZ}$ can not be obtained only by data on $M_{GX}$, $M_{GZ}$, $M_{GY}$ and $X_{GP}$, $Y_{GP}$, $Z_{GP}$, and to know these factors, another data concerning these force components must be required.

In this case, when the force component $F_{GZ}$ is given as another data required for the calculation of these force components, the influence of inertia force generated in the axis direction corresponding to $F_{GZ}$ must be considered.

However, in the case of robot arm, the direction in which the vibration of robot arm is remarkably generated is generally known. Therefore, the general force which acts on the gripper can be detected by directly detecting force components with respect to axes on which the vibration can be negligible, further by removing the influence of inertia force from the force component, by detecting the moment about the center of gravity of the gripper, with respect to the axis on which the vibtation can not be neglected.

With respect to the direction in which the influence of inertia force is negligible, it depends on the posture of the robot arm. Accordingly, to carry out the detection with efficiently avoiding the influence of the inertia force, it is necessary not only to shift the origin of sensor system to the center of gripper, but also to suitably rotate the coordinate axes.

Next, a fourth modification of the second embodiment is explained with reference to FIG. 22.

Figure 11:
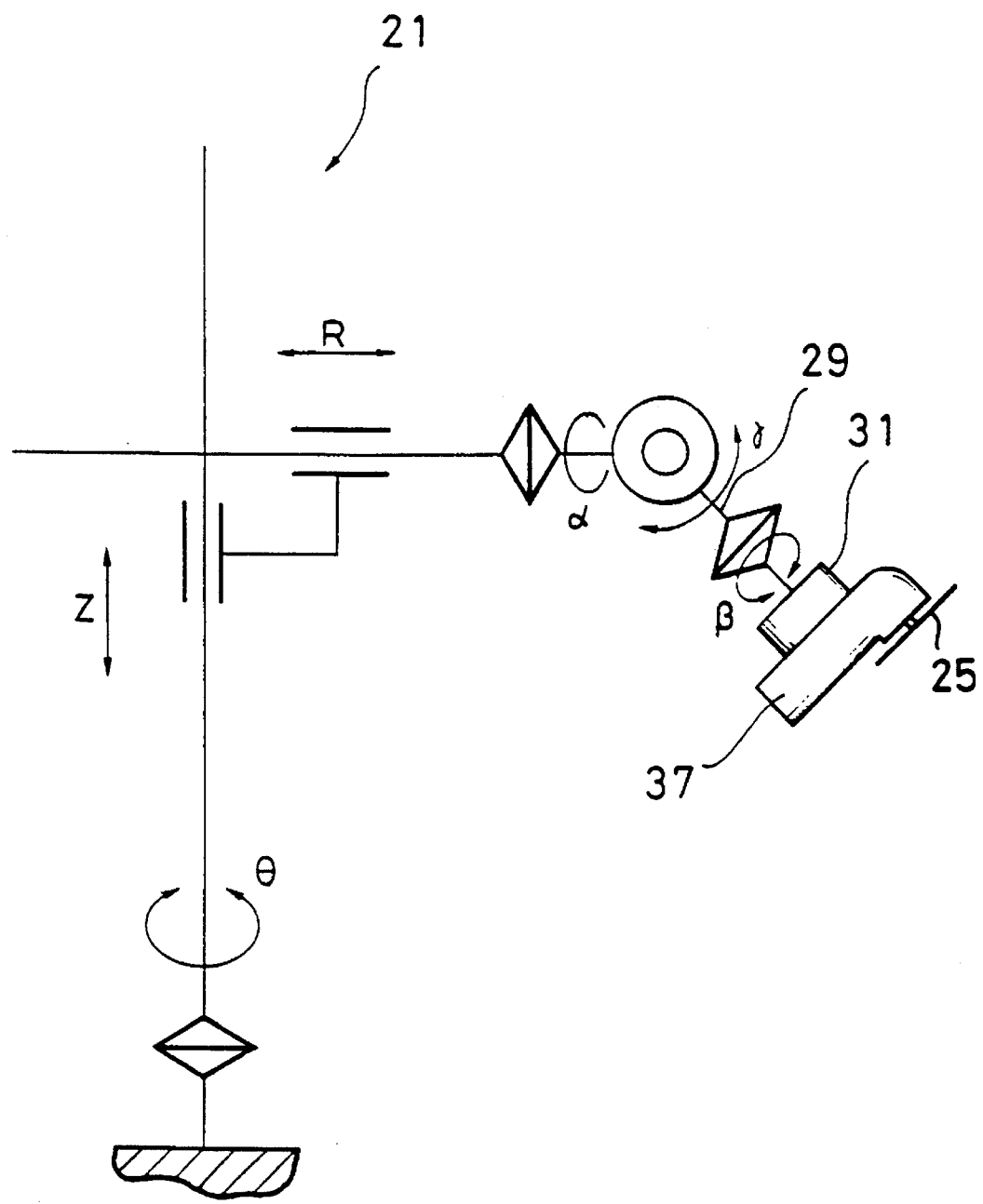
FIG. 11 is an explanatory diagram to show the robot shown in FIG. 1 with diagrammatical signs.

The fourth modification is another example of force control apparatus for controlling a force control robot as shown in FIGS. 9 to 11 for carrying out machining a work 27 whose shape is not known.

Incidentally, in this case, a coordinate system $\Sigma_W$ comprising rotating the grinder coordinate system $\Sigma_G$ in FIG. 10 by angle $\phi_{GW}$ about the axis $Y_G$ is considered as new grinder coordinate system. While, as sensor coordinate system, the sensor coordinate system $\Sigma_S$ in FIG. 10 is directly used. Moreover, $O_G$ designates the center of gravity of a grinder 25, and r is a distance from the contact portion between a grindstone 35 and a work 27 to the center $O_G$ of gravity. Besides, $\phi_{CG}$ is a pitch angle between the grinder 25 and the work 27. Furthermore, as absolute coordinate system, a coordinate system $\Sigma_o$ fixed at the base portion is considered in FIG. 11.

Moreover, $Z_W$ is considered as the pressing direction from the grinder 25 to the work 27, $X_W$ as the proceeding direction of the grinder 25, and $Y_W$ as the lateral transfer direction of the grinder 25. Namely, these directions are decided when the posture of the grinder 25 is decided.

Accordingly, when $Z_W$ is parallel to $Z_C$, the grinder 25 presses the grindstone 35 against the work 27 in the normal direction of the work 27. Moreover, by moving the grinder 25 in the directions $X_W$ and $Y_W$, the grinder 25 can move along the tangent direction of the work 27. Moreover, $\phi_{GW}$ designates a target pitch angle between the grinder 25 and the work 27.

On grinding work, if the posture of the grinder 25 can be controlled so that $Z_W$ and $Z_C$ are always parallel to each other based on the detection data from the six-shaft sensor 31, it is possible to grind the work, whose shape is unknown or curved, with keeping the posture of grinder 25 in a constant state against the work 27 at optional pressing force.

Figure 22B:
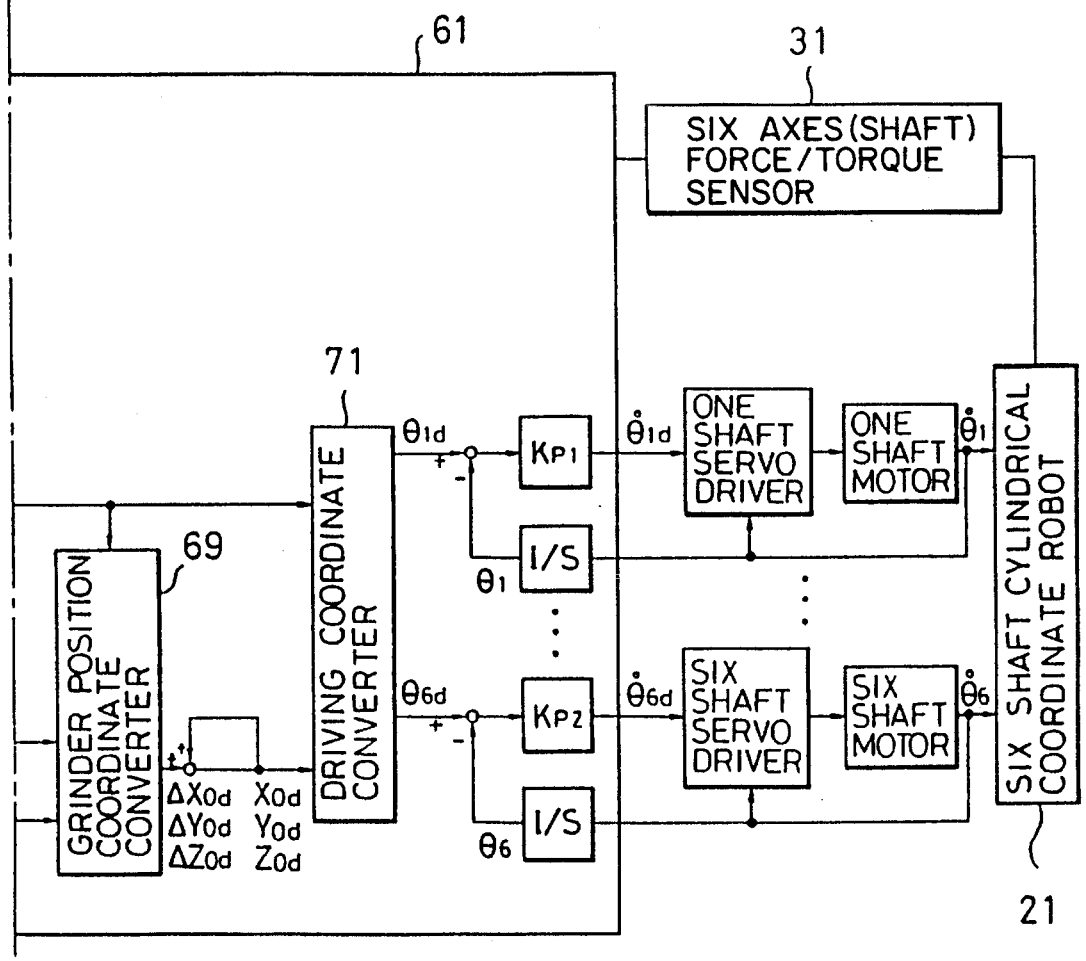

As shown in FIG. 22, in a force control apparatus 6 of the fourth modification of the second embodiment, from a host comuter 63 are respectively inputted target moment $M_{GXd}$ of the grinder 25, target pressing force $F_{WZd}$, target yawing angle $\phi_{GD}$ and target correction values $\Delta X_{Wd}$, $\Delta Y_{Wd}$. Incidentally, in case of manual operation, $\phi_{GD}$, $\Delta X_{Wd}$, $\Delta Y_{Wd}$ are inputted from an operation section such as joy stick.

Then, data detected by the six-shaft force sensor 31 are subjected to coordinate transformation by the force sensor coordinate converter 65 with respect to the center $O_G$ of gravity of the grinder 25. Subsequenty, each target roll angle $\phi_{Gd}$ on lateral transfer, on proceeding or on stop, is calculated based on $F_{WZ}$ or $M_{GX}$. Then, a grinder target pitch angle $\phi_{Gd}$ is calculated from $F_{WZ}$. Incidentally, the product term is not shown in the drawing. Then, from the target roll angle $\phi_{Gd}$, target pitch angle $\phi_{Gd}$, and the target yawing angle $\phi_{Gd}$ having been already set, target posture factors $\alpha_{Od}$, $\beta_{Od}$, $\gamma_{Od}$ are respectively obtained by expression, for example, in accordance with the Euler anglular display in the absolute coordinate system fixed at the base of the force control robot 21 in FIG. 11.

In more detail, the target roll angle and the target pitch angle can not be prepared at the same time by first coordinate transformation. Thus, for example, the target posture factors are prepared in consideration of only correction to the roll direction, then these factors are further prepared with respect to the correction of pitch direction. In such a manner, there can be prepared the target posture factors which satisfy the correction on both of the roll direction and the pitch direction. If required, the correction on the yawing angle is also considered.

Thereafter, another target correction value $\Delta Z_{Wd}$ in the pressing direction is calculated form $F_{WZ}$. Moreover, from $\Delta Z_{Wd}$, and $\Delta X_{Wd}$, $\Delta Y_{Wd}$ having been already set, the target posture factors $\alpha_{Od}$, $\beta_{Od}$, $\gamma_{Od}$ are decided by a grinder position coordinate converter 69, then the target positions $X_{Od}$, $Y_{Od}$, $Z_{Od}$ based on the absolute coordinate system are respectively calculated from these target posture factors a $\alpha_{Od}$, $\beta_{Od}$, $\gamma_{Od}$.

Moreover, from the target positions $X_{Od}$, $Y_{Od}$, $Z_{Od}$ and the target posture factors $\alpha_{Od}$, $\beta_{Od}$, $\gamma_{Od}$, target angles of respective joint shafts comprising six shafts are calculated by a driving coordinate converter 51. Then, the respective shafts are driven in accordance with these driving conditions.

Next, a method of controlling the force control robot 21 by using the force control apparatus 61 is explained.

First, to control the pressing direction $Z_W$, each moment about the respective shafts is obtained in accordance with the formulas (2) to (5) related to the second embodiment. Then, the control should be carried out so that the couterforce $F_{WZ}$ to the work obtained by the formula (2) be the same as the target pressing force $F_{WZd}$.

Namely, in the control, the target position in the pressing direction of the grinder 25 is corrected so as to make the counterforce $F_{WZ}$ the same as the target pressing force $F_{WZd}$.

Incidentally, the correction value $\Delta Z_{Wd}$ in the pressing direction is given by the following formula:

$$\Delta Z_{Wd} = K_{fZ}(F_{WZd} - F_{WZ}) \tag{11}$$

where $K_{fZ}$ is the force gain.

The correction on the target position in the direction $Z_W$ is carried out for each sample based on the formula (11). For example, when detected force is less than target force, the target postion of wrok 27 is shited in the direction opposite to the pressing direction.

While, the control of the proceeding direction $X_W$ and the lateral transfer direction $Y_W$ of the grinder 25 is carried out by preparing the respective target shift values $\Delta X_{Wd}$, $\Delta Y_{Wd}$ in the respective directions $X_W$, $Y_W$ in advance, for example with a computer, for each sampling. As the result, it becomes possible to grind any optional area of the work 27.

Otherwise, it becomes also possible to prepare these shift values with joy stick so as to carry out the grinding work manually.

Moreover, these correction values $\Delta X_{Wd}$, $\Delta Y_{Wd}$, $\Delta Z_{Wd}$ respectively in the pressing, the proceeding and the lateral transfer direction are subjected to coordinate transformation based on the target posture factors of the grinder 25 so as to prepare the target position of the grinder 25.

Next, the control method of the grinder 25 is explained. First, the control method concerning the pitch direction ($\phi_G$ about the axis $Y_G$) of the grinder 25 is explained. When the grinder 25 is moved in a state where the pitch angle $\phi_{CG}$, of the grinder 25 to the work 27 is in accord with $\phi_{GW}$, there is almost no error occurrence in the pressing force controlled by the formula (11).

Figure 24:
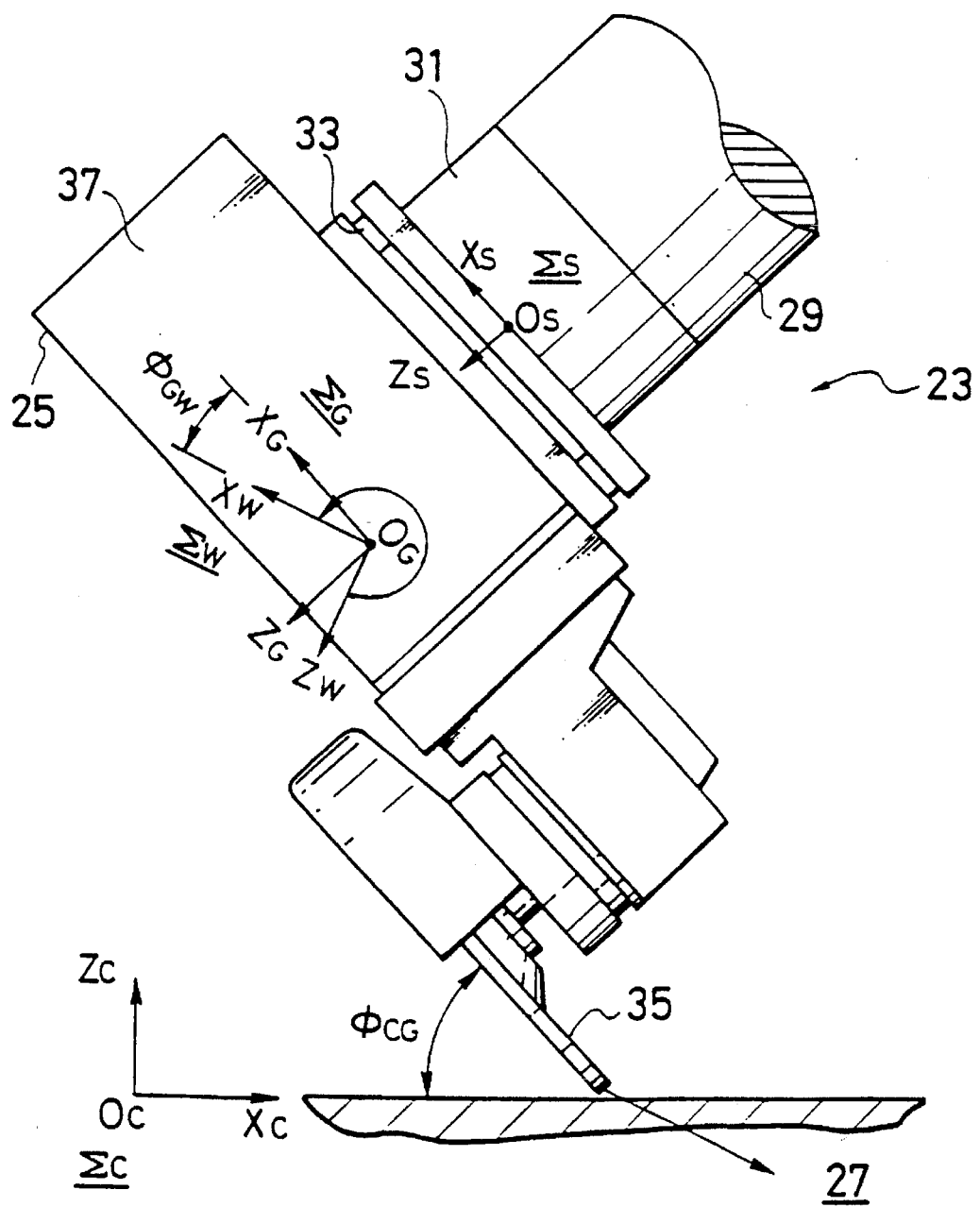
FIG. 24 is a side view of a machining tool of the fourth modification.

However, as shown in FIG. 24, when the grinder 25 is progressed (in the direction - $X_W$) in a state where $\phi_{CG}$ is larger than $\phi_{GW}$, the grinder 25 is urged in the pressing direction (desinated by an arrow in the drawing). Thus, the pressing force is increased. Therefore, when the grinder 25 is transferred at a constant speed, the difference between the pressing force $F_{WZ}$ and the target pressing force $F_{WZd}$ is maintained all the time of grinding work.

Conversely, when the grinder 25 is progressed (in the direction - $X_W$) in a state where $\phi_{CG}$ is smaller than $\phi_{GW}$, the grinder moves in the detachment direction. Thus, the pressing force is reduced. On the other hand, when the grinder is regressed, the result is reverse.

Accordingly, by changing the pitch angle $\phi_G$ of the grinder 25 so as to make the pressing force $F_{WZ}$ be the target pressing force $F_{WZd}$, the pitch angle between the grinder 25 and the work 27 can be kept at $\phi_{GW}$.

Namely, the following formula can be established in the same manner as in the formula (11):

$$\phi_{Gd(n)} = K_f(F_{WZd} - F_{WZ}) + \phi_{Gd(n-1)} \tag{12}$$

wherein $K_f$ is gain, and $\phi_{Gd(n-1)}$ means the target pitch angle before one sampling.

Incidentally, when the grinder is rotated about the shaft $Y_G$ with fixing the center $O_G$ of gravity, the pressing force is changed with change of the posture. Moreover, the pitch direction is rotated round the contact point between the grindstone 15 and the work 27.

Accordingly, the pitch angle with respect to the work 27 is changed by the formula (11), but does not affect the control of the pressing direction.

Actually, since the grinder 25 is progressed or regressed to the work 27, it is not always correct that the grinder 25 can move on the surface of the work 27 smoothly whenever it is rotated round the contact point.

Namely, in case of the progress, the grinder 25 can be smoothly moved along the surface of the work 27 by shifting the center of rotation toward the grinder 25, while in case of the regress, the center is shifted toward the contact point to this end. Accordingly, the center of rotation is suitably shifted to get the smooth operation.

On the other hand, in case of the grinding work to a flat surface, the pitch angle $\phi_{GC}$ can be arranged at $\phi_{GW}$ by the formula (12). However, when the gain $K_{f\phi}$ can not be increased so that the grinder can not be smoothly moved on the surface of the work, it is possible to construct the formula (12) not only with the first term concerning the comparision control but also with product terms as follows:

$$\phi_{Gd(n)} = K_{f\phi}(F_{WZd} - F_{Wd}) + K_{f\phi 1}\Sigma(F_{WZd} - F_{WZ}) + \phi_{Gd(n-1)} \quad (13)$$

In any case, the control is carried out so as to make the pitch angle $\phi_{CG}$ be the same as $\phi_{GW}$.

According to the formula (12) or (13), even if the surface of the work is circularly curved or successively changed with various curvatures, since the control is carried out so that the pitch angle $\phi_{CG}$ is always in accord with $\phi_{GW}$ when the grinder is moved in the prceeding direction, the grinder can be smoothly moved on the surface of the work.

Incidentally, the rotation diretion of grinder should be changed when the movement mode in the proceeding direction is changed, for example, from the progress mode to the regress mode. Therefore, the signs included in the formula (12) or (13) should be suitably changed in accordance with the movement mode. Namely, by combination of both of the control methods concerning the pitch angle and the pressing direction of the grinder 25, it becomes possible to carry out such grinding work as shown in an arrow designated by reference character 1 in FIG. 25 without any teaching on the change of curvature. However, it is necessary to set in advance the data concerning the surface for giving the above-described roll angle and yawing angle between the grinder 25 and the work 27.

Next, the control method of the roll direction of the grinder 25 (shaft $\theta$ about the shaft $X_G$) is explained.

When the grinder 25 is moved in the lateral direction or the $Y_W$ direction, the control is carried out in completely the same manner as in case of the control of pitch direction. Moreover, for smooth grinding work, the roll angle between the grinder 25 to the work should be set at 90°, that is, the shaft $X_W$ be in accord with the shaft $X_C$. Namely, when the grinder 25 is moved in the lateral direction in the state where the roll angle is 90°, error occurrence is hardly seen in the control in accordance with the formula (12).

On the other hand, when the grinder 25 is moved in the lateral direction in a state where the roll angle is shifted from 90° to some extent, similarly to the case of the pitch direction control, since the grinder 25 moves in the pressing or the reverse direction thereof, the pressing force is changed.

Accordingly, it is necessary to keep the roll angle between the grinder 25 and the work 27 at 90° by controlling the roll angle $\theta_G$ of the grinder 25 itself in accordance with the following formulas so that the pressing force $F_{WZ}$ is in accord with the target pressing force $F_{WD}$.

$$\theta_{Gd(n)} = K_{f\theta}(F_{WZd} - F_{WZ}) + \theta_{Gd(n-1)} \quad (14),$$

or $$\theta_{Gd(n)} = K_{f\theta}(F_{WZd} - F_{Wd}) + K_{f\theta 1}\Sigma(F_{WZd} - F_{WZ}) + \theta_{Gd(n-1)} \quad (15)$$

wherein the formula (15) further contains product terms as compared with the formula (14).

When the grinder 25 is moved in accordance with the formula (14) or (15), the roll angle between the grinder 25 and the work 27 can be always kept at 90°.

To prevent overgrinding on the lateral transfer, it is possible to set the target pressing force on the lateral transfer to be smaller than the target pressing force on proceeding.

Accordingly, by combination of the control method of the roll angle and the control method of the proceeding direction, it becomes possible to carry out such grinding work as shown in an arrow designated by reference character 2 in FIG. 25 without any teaching on the change of curvature. However, it is necessary to set in advance the data concerning the surface for giving the above-described pitch angle and yawing angle between the grinder 25 and the work 27.

By the above-described method, it is impossible to correct the roll angle when the grinder 25 is moved in the pressing direction or is stopped. Therefore, the control method of roll angle in the proceeding mode in the pressing direction or stop mode is explained hereinafter.

Figure 26A:
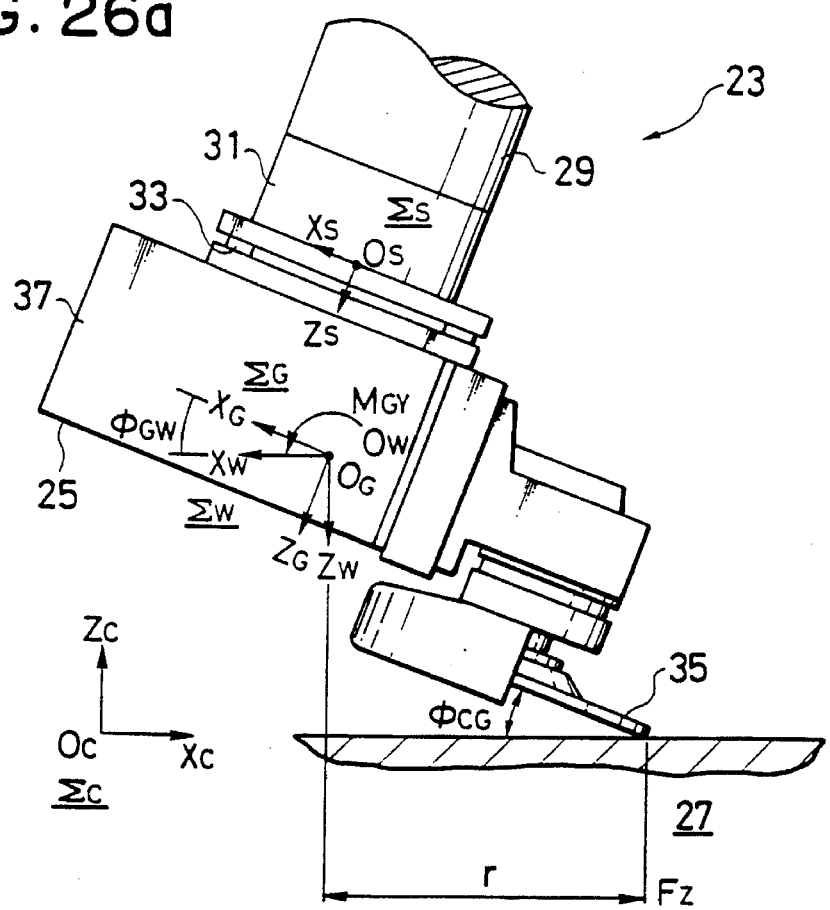
FIG. 26a is a side view to show a machining tool.
Figure 26B:
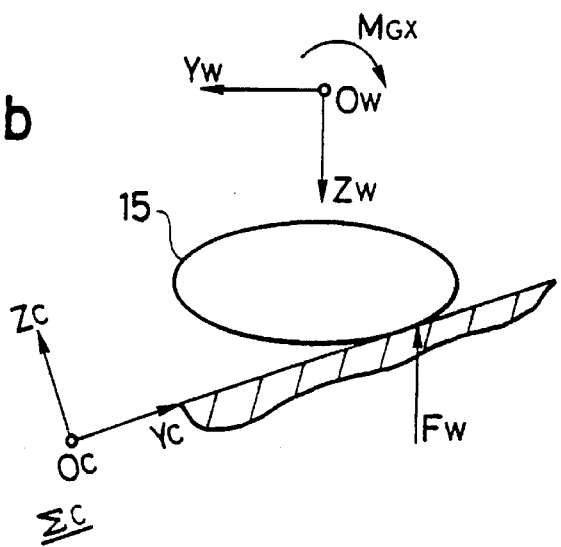
FIG. 26b is a side view of a machining tool whose roll angle is shifted by 90° with respect to a work.

For example, as shown in FIG. 26, when the roll angle is shifted by 90° against the work 27, $Z_W$ is not in accord with $Z_C$. Therefore, the pressing force effects in the inclining direction so that the moment $M_{GX}$ about the axis $X_G$ is changed. When grinding work is not carried out, since the moment $M_{GX}$ does not effect even when the pressing is carried out in the state where the roll angle is shifted by 90° against the work 27, the target moment $M_{GXd}$ is 0. While, when the grinding work is carried out, this torque is not 0 because of the grinding resistance or motor torque. Moreover, the torque varies with kinds of grindstone or work and the pressing force. Accordingly, by setting the target roll angle so as to make the moment $M_{GX}$ be the target moment $M_{GXd}$ when the roll angle is shifted by 90° with respect to the work 27, the roll angle can be controlled when the grinder 25 is moved in the pressing direction or is in the stop mode.

Namely, the control condition can be expressed as follows:

$$\theta_{Gd(n)} = K_{f\theta 2}(M_{GXd} - M_{GX}) + \theta_{Gd(n-1)} \quad (15)$$

In case of this formula, it is necessary to obtain the target moment $M_{GXd}$ in advance from the detection on pressing, however, and also to investigate in advance the grinding conditions such as kind of work, kind of grindstone, pressing force, proceeding speed and lateral transfer pitch.

Similarly to the rotation in the pitch direction, the rotation in the roll direction is carried out around the contact point between the grindstone and the work.

Next, the control method of the yawing direction ($\phi_G$: about the axis $X_G$) is explained.

When the yawing angle is changed, the proceeding angle of the grinder 25 is changed. Accordingly, the angle is set in advance in accordance with an area to be ground. During grinding work, it is not necessary to change the yawing angle, however, when the grind angle or grind area is changed, the angle should be suitably changed.

With respect to the posture control method, though the method of rotation about the respective axes in the coordinate system $\Sigma_G$ has been already explained, the posture can be controlled also by rotation about the respective axes of the coordinate system $\Sigma_w$.

As stated above, according to the control methods about the pressing direction of grinder, proceeding direction in the pressing direction, lateral transfer direction, roll pitch, and yawing angle, even when the surface of work is changed three-dimensionally, the grinding work can be carried out with optional pressing force with automatically changing the posture so that the grinder posture to the work be constant without any detailed teaching on the shape.

For example, in case of grinding for a work with an indeterminate shape under special working environment, even when the work shape and the work position to robot can not be set in advance, if approximate relation between them and the grinder posture are given through a monitor or the like, the work can be carried out with ease and high efficiency.

On the other hand, in manual operation by means of joy stick, if an approximate initial posture is given, the grinding work can be carried out with automatically controlling the pressing force and the grinder posture only by two-dimensional joy stick operation. Moreover, by setting the proceeding and the lateral movement patterns of the grinder 25 in advance, it becomes possible to automatically grind an optional area of the work with ease.

Figure 27:
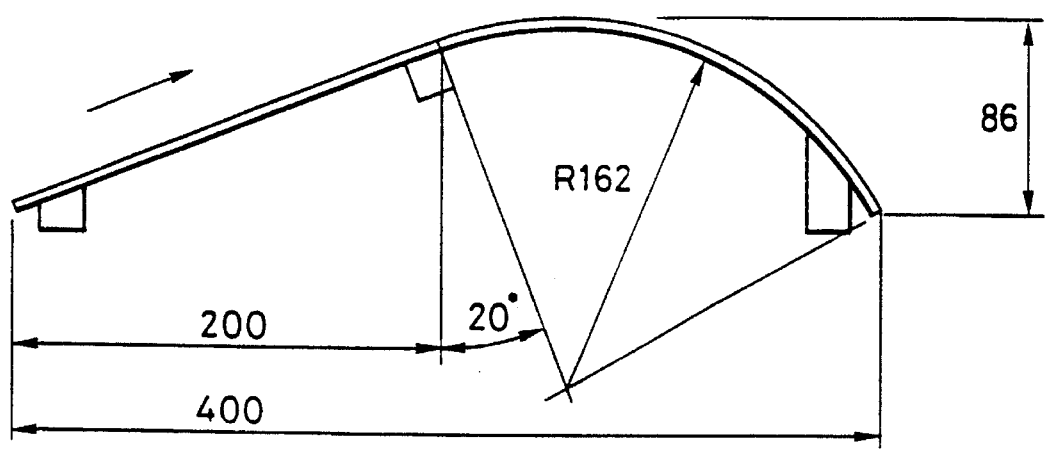
FIG. 27 is a side view to show a cross section of a work.
Figure 28:
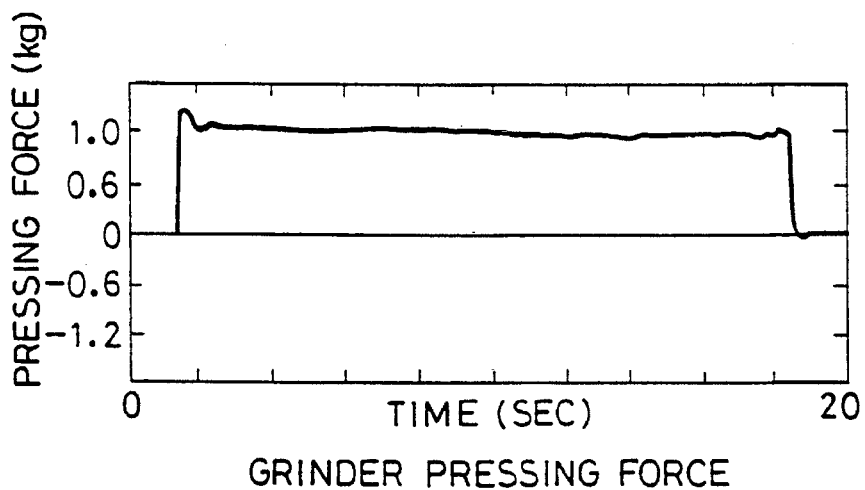
FIGS. 28 to 30 show experimental results respectively.
Figure 29:
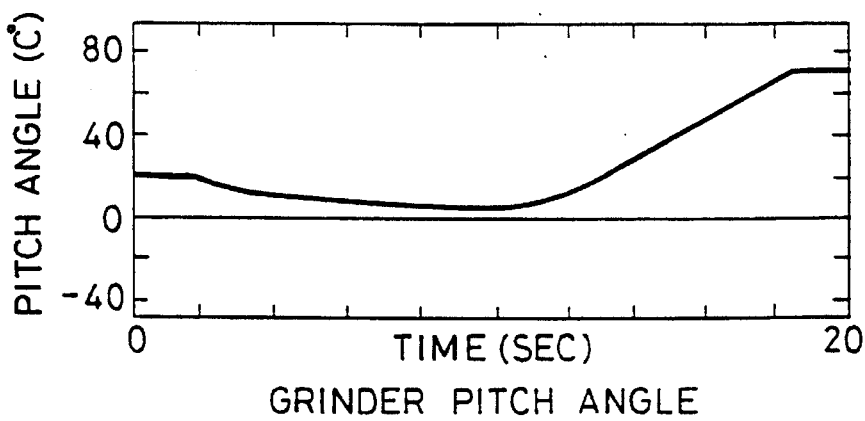
Figure 30:
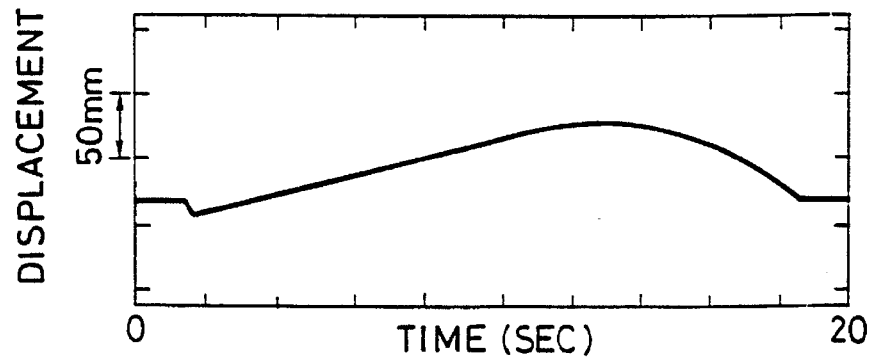

Next, there is provided an example of experimental results on grinding work which carried out according to the above control method without any teachings about the work shape. In the experiment, a work having a cross section as shown in FIG. 27 is subjected to grinding work along an arrow designated in the same drawing under conditions: 1.2 kgf of target pressing force FWZd, 2.5 cm/s of grinder movement speed $\Delta X_{WZ}$, 25° of target pitch angle $\phi_{GW}$ with respect to the work, and 40° of initial pitch angle of grinder to work (therefore, the error is 15°). FIGS. 28 to 30 respectively show the pressing force of grinder with respect to time, the pitch angle (from the horizontal plane) to time, and displacement to time for showing an orbit of the distal end of grindstone calculated from joint angles of the six shafts. From these drawings, it is clearly seen that tile grinder posture is changed so as to control the pitch angle to be 25° so that the pressing force becomes constant.

Figure 23:
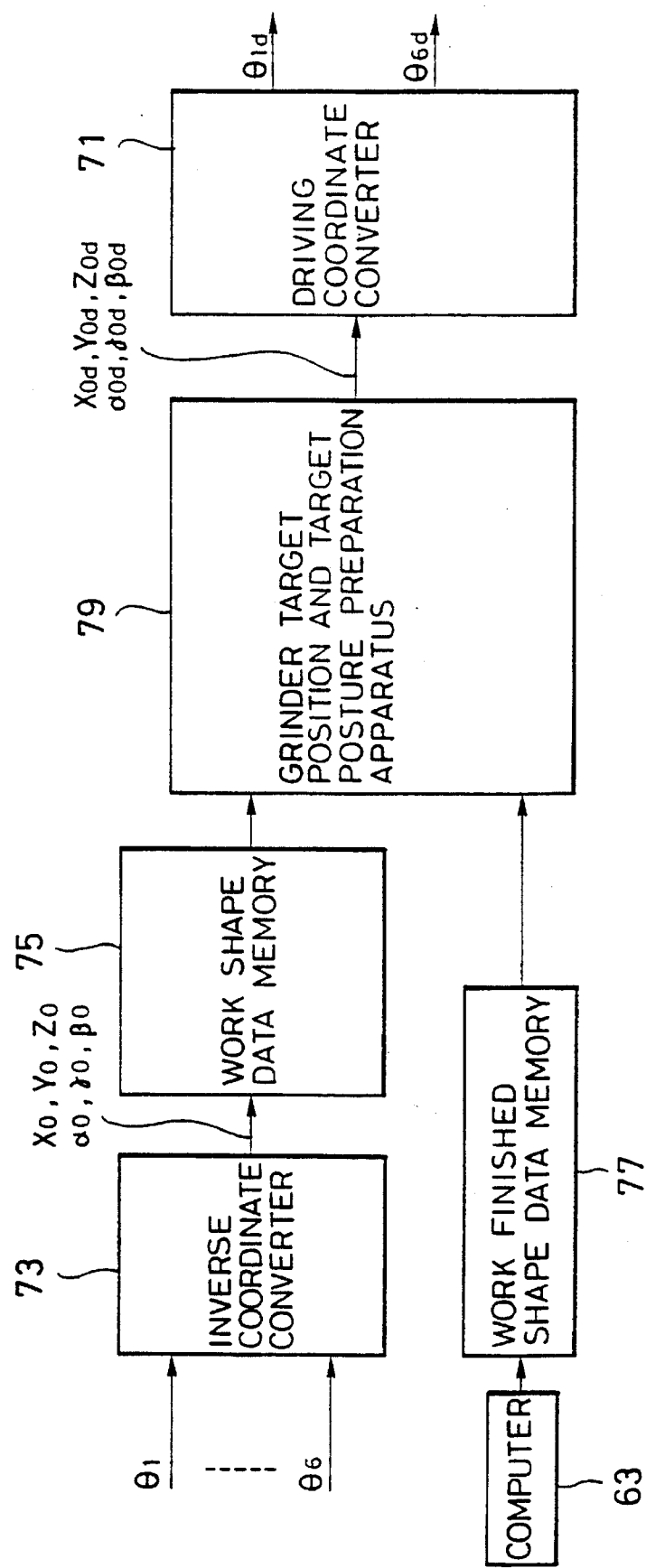
FIG. 23 is a block diagram to show a part of a force control apparatus as fifth modification of the second embodiment.

Next, a fifth modification of the second embodiment is explained with reference to FIG. 23. The fifth modification shows a force control apparatus for effecting grinding work with pressing the grinder agaist a work whose shape is unknown. Moreover, this modification shows a case where a work of unknown shape is finished into an optional shape. In a block diagram shown in FIG. 23, only a portion which is different from the force control apparatus in FIG. 22 is shown.

In the initial state, since the work shape is not confirmed by the force control robot, the grinding work is carried out according to the third modification of the force control apparatus with pressing the grinder against the work of unknown shape. At the time, the actual grinder position and grinder posture $X_O$, $Y_O$, $Z_O$, $\alpha_O$, $\beta_O$, $\gamma_O$ based on the absolute coordinate system are calculated by an inverse coordinate converter 73 with respect to joint angles of the six shafts, then the respective data are memorized by a work shape data memory 55. As the result, the force control robot can recognize the work shape.

From data given from a computer 63 to a work finished shape data memory 79, and also from data of the work shape data memory 75, respective target grinder position and target grinder posture $X_{OP}$, $Y_{OP}$, $Z_{OP}$, $\alpha_{OP}$, $\beta_{OP}$, $\gamma_{OP}$ based on the absolute coordinate system are prepared by a grinder target position and target posture preparation apparatus 75.

Then, the respective data are also inputted to a driving coordinate converter 71 so as to drive the respective shafts.

Thus, the work 27 of unkown shape can be finished into an optional shape.

Incidentally, the grinder target position and target posture preparation apparatus 79 may provide force control in the normal direction of the work 27 and a target position in the movement direction corresponding to the movement speed when the finished shape data and the initially momorized data are different from one another, or may perform positional control when the difference is small or negligible. In any case, since the work shape data are already known this time, it is also possible to use a conventional control method.

Moreover, in case that a special tool is not used for the work, the apparatus can be used as means for confirming unknown shapes.

As application examples of the present invention, a robot of cylindrical coordinate system is used in each modification of the embodiment, however, the application is not limited to the robot of this type, and also can be applied to a robot of rectangular coordinate type, polar coordinate type and multi-joint coordinate type.

Moreover, in each embodiment, though the six-shaft force sensor is used as pressing force detection sensor, it is not limited to this type, and it is also possible to use any type of sensor if it can detect pressing force in necessary directions.

Besides, though the moment MWG effecting about the center of gravity of grinder 25 is used for detection of the pressing force, if the grinder size is small so that the influence of inertia force is not so large, it is possible to directly detect the pressing force.

As decribed above, according to the second embodiment, the influence of gravity and inertia can be eliminated with ease, and the correct detection of pressing force applied from the machining tool to the work becomes possible, further the response ability in force control and the working accuracy can be much improved.

Moreover, there can be provided a force control robot which can carry out machining work with always pressing the machinig tool in the normal direction to the work, and with keeping the posture of the machining tool in a constant state against the work by changing the posture thereof without any teachings about the work shape even if it is initially unknown.

Various modifications will become possible for those skilled in the art after receiving the teachings of the present disclosure without departing from the scope thereof.

What is claimed is:

1. A force control robot for detecting pressing force to be applied from a machining tool attached at a robot arm to a work to be machined, and controlling the detected pressing force to be a target pressing force, comprising:

(a) detection means for detecting counterforce to the pressing force applied to the machining tool; and (b) arithmetical operation means for obtaining moment about a center of gravity of the machining tool by shifting a detection position at which the counterforce is detected by the detection means to a center of gravity of the machining tool so that the detection point apparently overlaps the center of gravity, for calculating the pressing force applied from the machining tool to the work based on the moment, and for controlling operation of the machining tool so that the pressing force applied to the work substantially coincides with the target pressing force.

2. The force control robot according to claim 1, wherein:

the arithmetical operation means comprises a target pressing force output section which inputs target pressing force to be applied from the machining tool to the work from an external unit, then outputs a target pressing force signal, a target position output section which inputs a target position from an operation section, then outputs a target position signal, a target posture and position output section which inputs target posture and position from an operation section, then outputs a target posture and position signal, a coordinate converter which inputs the target pressing force signal from the target pressing force output section, the target position signal from the target position output section, and the target posture and position signal from the target posture and position output section, and outputs a target angle, and a coordinate converter which obtains moment about the center of gravity of the machining tool based on the data detected by the detection means, and obtains a predetermined pressing force from the moment, then outputs the obtained pressing force.

3. A force control robot for detecting pressing force to be applied from a machining tool attached at a robot arm to a work to be machined, and controlling the detected pressing force to be a target pressing force, comprising:

(a) detection means for detecting counterforce to the pressing force applied to the machining tool; and (b) compensation means for obtaining moment about a center of gravity of the machining tool based on data detected by the detection means, then for obtaining counterforce to the pressing force based on the moment about the center of gravity, so as to compensate the data from the detection means, and for controlling operation of the machining tool so that the pressing force applied to the work substantially coincides with the target pressing force.

4. The force control robot according to claim 3, wherein the compensation means is arithmetical operation means which shifts a detection position at which the counterforce is detected by the detection means to the center of gravity of the machining tool, and obtains the moment about the center of gravity, so as to calculate the pressing force to be applied from the machining tool to the work.

5. The force control robot according to claim 3, wherein the compensation means includes a counterweight which is attached to the machining tool so that the detection position coincides with the center of gravity of the machining tool.

6. A force control robot for detecting pressing force to be applied from a machining tool attached at a robot arm to a work to be machined, and controlling the detected pressing force to be a target pressing force, comprising:

(a) detection means for detecting counterforce to the pressing force applied to the machining tool;

(b) posture changing means for changing the posture of the machine tool so that data detected by the detection means substantially coincides with the target pressing force; and (c) driving means for pressing or moving the machining tool along a fixing direction of the machining tool.

7. A force control robot according to claim 6, wherein a center of rotation of the machining tool for the posture control is set in the vicinity of the contact point between the machining tool and the work.

8. A force control robot for detecting pressing force to be applied from a machining tool attached at a robot arm to a work to be machined, and controlling the detected pressing force to be a target pressing force, comprising:

(a) work shape memory means for memorizing a shape of the work from a movement orbit of the machining tool;

(b) finished shape memory means of memorizing a finished shape of the work; and (c) arithmetical operation means for calculating target position and target posture of the machining tool from the shapes memorized by the work shape memory means and the finished shape memory means, and for controlling operation of the machining tool so that the pressing force applied to the work substantially coincides with the target pressing force, based on the target position and target posture of the machining tool.

* * * * *